(12) United States Patent
Zai et al.

(10) Patent No.: US 10,386,456 B1
(45) Date of Patent: Aug. 20, 2019

(54) WIDEBAND RADIO-FREQUENCY ANTENNA

(71) Applicant: Humatics Corporation, Waltham, MA (US)

(72) Inventors: Andrew Habib Zai, Sudbury, MA (US); Gregory L. Charvat, Guilford, CT (US)

(73) Assignee: Humatics Corporation, Waltham, MA (US)

( * ) Notice: Subject to any disclaimer, the term of this patent is extended or adjusted under 35 U.S.C. 154(b) by 0 days.

(21) Appl. No.: 16/144,830

(22) Filed: Sep. 27, 2018

(51) Int. Cl.
| | | |
|---|---|---|
| *H01Q 1/24* | (2006.01) | |
| *H01Q 9/30* | (2006.01) | |
| *G01S 5/14* | (2006.01) | |
| *H01Q 9/27* | (2006.01) | |
| *H01Q 1/38* | (2006.01) | |
| *G01S 5/02* | (2010.01) | |

(52) U.S. Cl.
CPC .............. *G01S 5/14* (2013.01); *G01S 5/0215* (2013.01); *H01Q 1/38* (2013.01); *H01Q 9/27* (2013.01)

(58) Field of Classification Search
CPC ........ H01Q 1/2266; H01Q 1/243; H01Q 9/30; H01Q 1/266; H01Q 1/24; H04W 16/22
USPC ..... 343/702, 789, 898; 333/212; 455/456.41
See application file for complete search history.

(56) References Cited

U.S. PATENT DOCUMENTS

| | | | | | |
|---|---|---|---|---|---|
| 5,699,029 | A | * | 12/1997 | Young ..................... | H01P 1/208 333/129 |
| 5,969,584 | A | * | 10/1999 | Huang .................. | H01P 1/2084 333/202 |
| 8,102,321 | B2 | * | 1/2012 | Chiang .................. | H01Q 1/243 343/702 |
| 8,125,394 | B2 | * | 2/2012 | Chiang .................... | H01Q 9/30 343/702 |
| 8,175,851 | B1 | * | 5/2012 | Francis ................... | G01S 3/043 702/199 |
| 8,269,677 | B2 | * | 9/2012 | Guterman ............ | H01Q 1/2266 343/702 |
| 8,319,692 | B2 | * | 11/2012 | Chiang .................. | H01Q 1/243 343/702 |

(Continued)

OTHER PUBLICATIONS

U.S. Appl. No. 16/144,865, filed Sep. 27, 2018, Zai et al.
U.S. Appl. No. 16/155,891, filed Sep. 27, 2018, Zai et al.

*Primary Examiner* — William D Cumming
(74) *Attorney, Agent, or Firm* — Wolf, Greenfield & Sacks, P.C.

(57) ABSTRACT

Radio-frequencies (RF) antennas for use in micro-localization systems are described. The RF antennas described herein may enable localization of objects with high resolutions, such as in the order of one centimeter or less. The RF antennas may be further configured to reduce range error variability across different directions, so that the accuracy of a micro-localization system is substantially the same regardless of the position of the object. An illustrative RF antenna includes a conductive housing forming a first cavity separated from a second cavity by a conductive wall. The RF antenna may further include an emitting element coupled to the conductive housing, a port coupled to the conductive housing, and an antenna feed electrically coupling the emitting element to the port. The antenna feed may pass through the cavities and the conductive wall. The antenna feed may comprise a symmetric and an asymmetric portion, disposed in the different cavities.

30 Claims, 21 Drawing Sheets

(56) References Cited

U.S. PATENT DOCUMENTS

| | | | | |
|---|---|---|---|---|
| 8,817,927 B2* | 8/2014 | Zai | ............ | G01S 7/023 |
| | | | | 375/349 |
| 9,015,019 B1* | 4/2015 | Kim | ............ | H04W 16/22 |
| | | | | 703/13 |
| 9,059,514 B2* | 6/2015 | Sanford | ............ | H01Q 1/243 |
| 9,455,489 B2* | 9/2016 | Shiu | ............ | H01Q 1/24 |
| 9,917,755 B1* | 3/2018 | Rullmann | ............ | H04L 43/0852 |
| 10,090,944 B1* | 10/2018 | Charvat | ............ | H04B 17/27 |
| 2010/0182205 A1* | 7/2010 | Chiang | ............ | H01Q 9/30 |
| | | | | 343/702 |
| 2010/0231481 A1* | 9/2010 | Chiang | ............ | H01Q 1/243 |
| | | | | 343/898 |
| 2011/0050508 A1* | 3/2011 | Guterman | ............ | H01Q 1/2266 |
| | | | | 343/702 |
| 2011/0050509 A1* | 3/2011 | Ayala Vazquez | ............ | H01Q 1/2266 |
| | | | | 343/702 |
| 2012/0105294 A1* | 5/2012 | Chiang | ............ | H01Q 1/243 |
| | | | | 343/789 |
| 2013/0050032 A1* | 2/2013 | Shiu | ............ | H01Q 1/24 |
| | | | | 343/702 |
| 2013/0101073 A1* | 4/2013 | Zai | ............ | G01S 7/023 |
| | | | | 375/349 |
| 2018/0175809 A1* | 6/2018 | Zai | ............ | H03F 1/3247 |

* cited by examiner

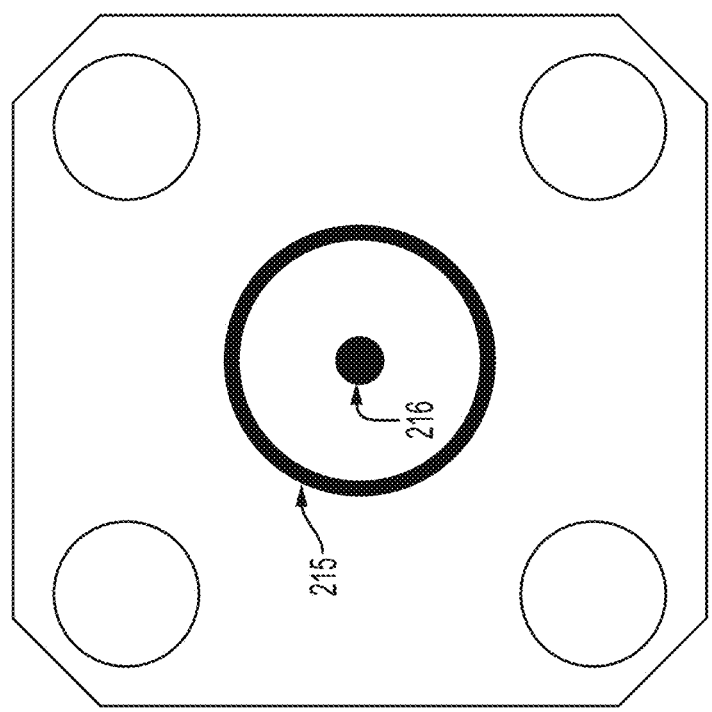
FIG. 5C

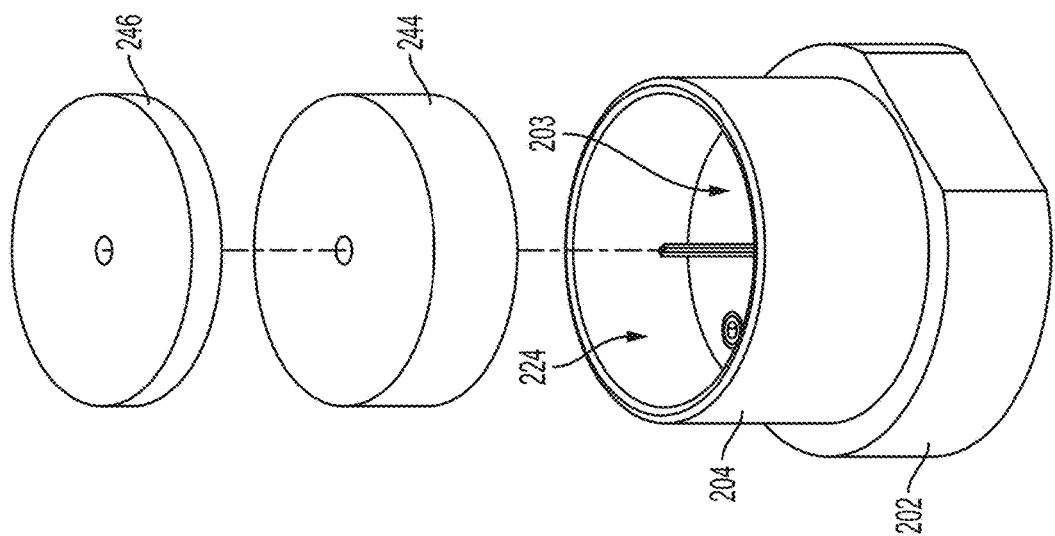
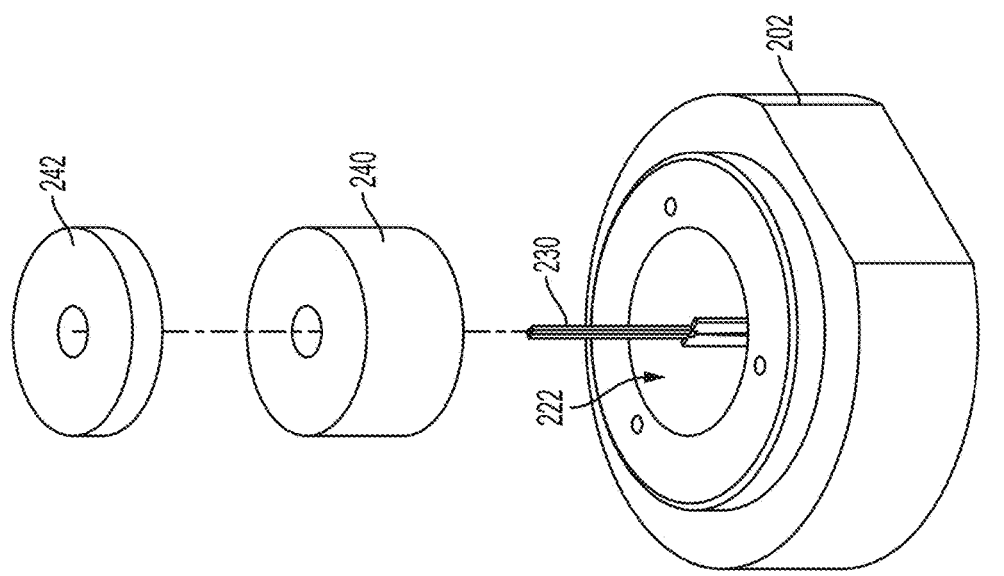
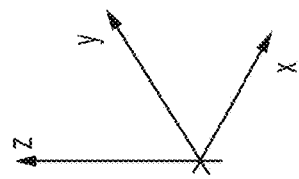

WIDEBAND RADIO-FREQUENCY ANTENNA

BACKGROUND

The ability to accurately determine the location of an object or target has potential benefits for numerous applications. Some exemplary applications benefiting from object localization include motion tracking, virtual reality, gaming, autonomous systems, robotics, etc. A number of technologies have been pursued that seek to provide localization, including global positioning system (GPS) technology, received signal strength indicator (RSSI) measurements, optical image data processing techniques, infrared ranging, etc. Generally, these conventional approaches are limited in application due to one or more deficiencies, including relatively poor or insufficient accuracy and/or precision, computational complexity resulting in relatively long refresh rates, environmental limitations (e.g., operation limited to outdoors, cellular or network access requirements and/or vulnerability to background clutter or noise), cost, size, etc.

SUMMARY

Some embodiments are directed to a radio-frequency (RF) antenna, comprising a conductive housing having a first cavity and a second cavity separated from the first cavity by a conductive wall; an emitting element coupled to the conductive housing; a port coupled to the conductive housing; and an antenna feed electrically coupling the emitting element to the port, the antenna feed passing through the first cavity, the conductive wall, and the second cavity.

Some embodiments are directed to a micro-localization system comprising an interrogator device. The interrogator device may comprise a radio-frequency (RF) antenna comprising: a conductive housing having a first cavity and a second cavity separated from the first cavity by a conductive wall; an emitting element coupled to the conductive housing; a port coupled to the conductive housing; and an antenna feed electrically coupling the emitting element to the port, the antenna feed passing through the first cavity, the conductive wall, and the second cavity. The RF antenna may be configured to transmit a first RF signal having a first center frequency to a target device different from the interrogator device, and receive, from the target device, a second RF signal having a second center frequency different from the first center frequency. The interrogator device may further comprise circuitry configured to provide to the RF antenna the first RF signal having the first center frequency to be transmitted by the RF antenna, and process the second RF signal having the second center frequency received by the RF antenna together with a reference version of the first RF signal having the first center frequency to obtain an RF signal indicative of a distance between the interrogator device and the target device.

Some embodiments are directed to an RF antenna, comprising a conductive housing comprising a first cavity; an emitting element coupled to the conductive housing; a port coupled to the conductive housing; and an antenna feed electrically coupling the emitting element to the port, the antenna feed passing through the first cavity and comprising a symmetric portion in contact with the emitting element and an asymmetric portion in contact with the port.

Some embodiments are directed to a micro-localization system comprising an interrogator device. The interrogator device may comprise an RF antenna comprising a conductive housing comprising a first cavity; an emitting element coupled to the conductive housing; a port coupled to the conductive housing; and an antenna feed electrically coupling the emitting element to the port, the antenna feed passing through the first cavity and comprising: a symmetric portion in contact with the emitting element; and an asymmetric portion in contact with the port. The RF antenna may be configured to transmit a first RF signal having a first center frequency to a target device different from the interrogator device; and receive, from the target device, a second RF signal having a second center frequency different from the first center frequency. The interrogator device may further comprises circuitry configured to provide to the RF antenna the first RF signal having the first center frequency to be transmitted by the RF antenna; and process the second RF signal having the second center frequency received by the RF antenna together with a reference version of the first RF signal having the first center frequency to obtain an RF signal indicative of a distance between the interrogator device and the target device.

Some embodiments are directed to an RF antenna, comprising a conductive housing comprising a cavity; an emitting element coupled to the conductive housing, the emitting element being designed to reduce angular impulse delay variability of the RF antenna; a port coupled to the conductive housing; and an antenna feed electrically coupling the emitting element to the port, the antenna feed passing through the cavity.

Some embodiments are directed to a method for characterizing performance of a first RF antenna, the method comprising placing the first RF antenna on a stationary structure; placing a second RF antenna on a movable structure; obtaining a first electromagnetic scattering parameter set associated with the first RF antenna at a first location relative to the second RF antenna, the first electromagnetic scattering parameter set comprising a first plurality of values for a respective first plurality of frequencies; obtaining a second electromagnetic scattering parameter set associated with the first RF antenna at a second location relative to the second RF antenna, the second electromagnetic scattering parameter set comprising a second plurality of values for a respective second plurality of frequencies; obtaining a first impulse response by computing a Fourier transform of the first electromagnetic scattering parameter set and obtaining a second impulse response by computing a Fourier transform of the second electromagnetic scattering parameter set; and determining, using the first and second impulse responses, a first range error associated with the first RF antenna at the first location relative to the second RF antenna, and a second range error associated with first RF antenna at the second location relative to the second RF antenna.

Some embodiments are directed to a method for designing an RF emitting element for use in connection with a micro-locating system, the method comprising obtaining, for each of a plurality of designs of RF emitting elements, a respective measure of angular impulse delay variation to obtain a plurality of measures of angular impulse delay variation, the obtaining comprising 1) accessing information specifying a first design of a first RF emitting element, the information specifying a first set of values for at least one parameter of the first design for the first RF emitting element; 2) determining, using the first set of values for the at least one parameter, a plurality of angular impulse delays for a respective plurality of look angles; 3) determining a measure of angular impulse delay variation for the first design of the first RF emitting element; and selecting a design of an RF emitting element based on the plurality of measures of angular impulse delay variation.

The foregoing is a non-limiting summary of the invention, which is defined by the attached claims.

BRIEF DESCRIPTION OF DRAWINGS

Various aspects and embodiments will be described with reference to the following figures. It should be appreciated that the figures are not necessarily drawn to scale.

FIG. 5C is a top view of the illustrative port of FIG. 4A, in accordance with some embodiments of the technology described herein.

FIG. 6A is an exploded view of a first portion of the illustrative RF antenna of FIG. 2, in accordance with some embodiments of the technology described herein.

FIG. 6B is an exploded view of a second portion of the illustrative RF antenna of FIG. 2, in accordance with some embodiments of the technology described herein.

DETAILED DESCRIPTION

I. Overview

Figure 1A:
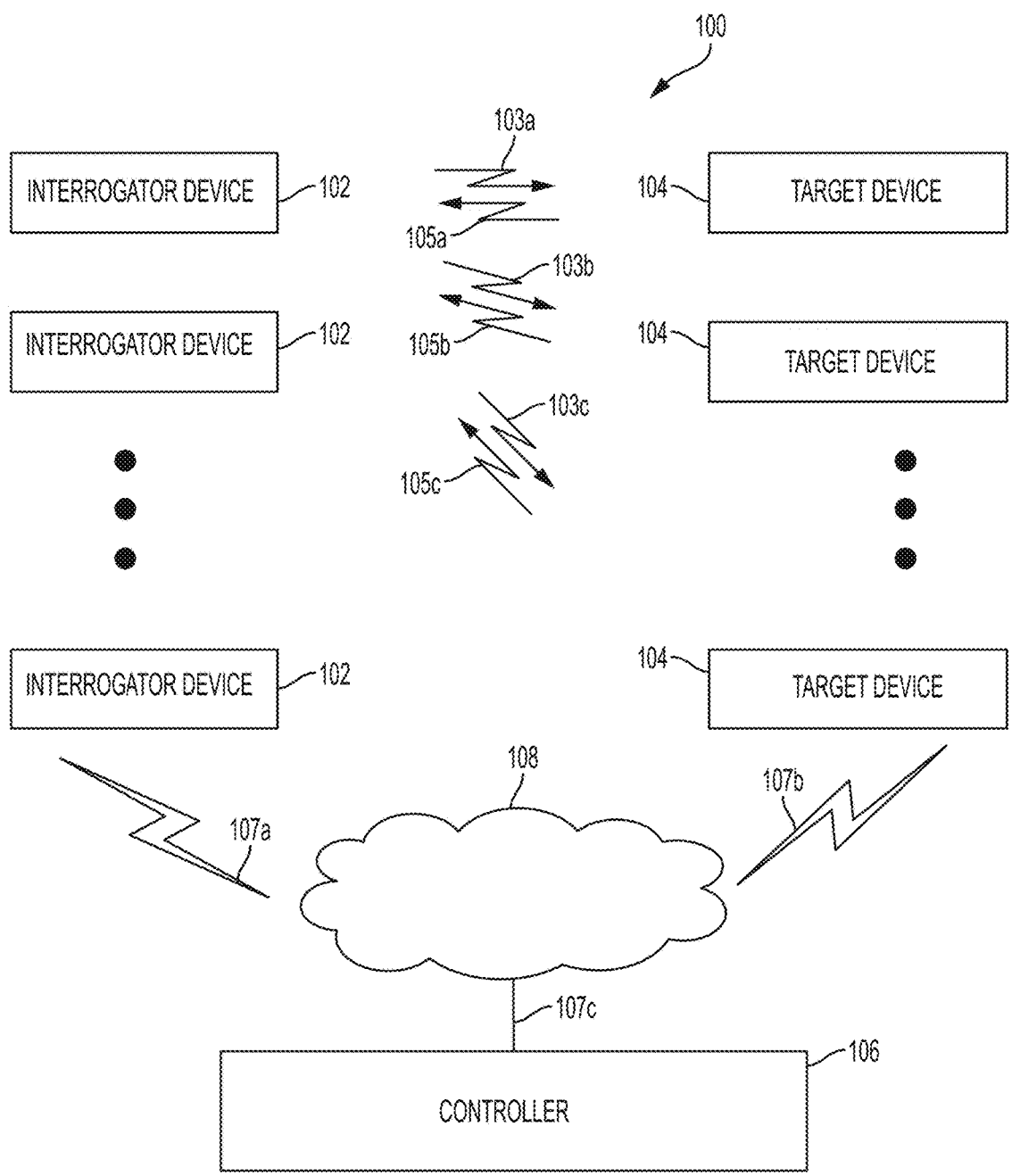
FIG. 1A shows an illustrative system 100 that may be used to implement radio frequency (RF) localization techniques, in accordance with some embodiments of the technology described herein.

Determining the location of an object with a high degree of accuracy and precision has an array of applications in a variety of fields including autonomous vehicle navigation, robotics, virtual reality, motion tracking, and motion capture. Some applications require localization techniques capable of resolving the location of an object in the millimeter and sub-millimeter range. Such techniques are referred to herein generally as micro-localization techniques.

Some micro-localization techniques use radio-frequency (RF) signals to determining the location of an object. For example, a micro-localization system may include an interrogator device configured to transmit an RF signal (e.g., a microwave or millimeter wave RF signal) and a target device configured to, in response to receiving the RF signal, transmit an RF signal to be received by the interrogator device. The RF signal received from the target device may be used (e.g., by the interrogator device) together with a version of the transmitted RF signal to determine the time-of-flight between the interrogator and the target devices, and in turn the distance between them. Examples of such micro-localization systems are described in U.S. Pat. No. 9,797,988 titled "RADIO FREQUENCY LOCALIZATION TECHNIQUES AND ASSOCIATED SYSTEMS, DEVICES, AND METHODS" dated Oct. 24, 2017, which is herein incorporated by reference in its entirety.

The inventors have recognized and appreciated that the RF antennas used by conventional RF-based micro-localization systems limit the ability of these systems to resolve the location of targets with millimeter and sub-millimeter resolutions. For example, RF antennas used by conventional RF-based micro-localization systems exhibit distorted emission patterns due to the fact that they are particularly susceptible to electromagnetic interference and multipath effects. The inventors have developed a class of RF antennas for use in RF-based micro-localization systems that improve upon the conventional RF antennas used in such systems, which in turn improves the accuracy and robustness of the resulting micro-localization systems. For example, when used in micro-localization, the RF antennas described herein may enable localization of objects to within 10 cm or less, 5 cm or less, 1 cm or less, 8 mm or less, 5 mm or less, or 3 mm or less, in some embodiments. The RF antennas described herein may be used with any suitable RF-based micro-localization system including any of the micro-localization systems described in U.S. Pat. No. 9,797,988 titled "RADIO FREQUENCY LOCALIZATION TECHNIQUES AND ASSOCIATED SYSTEMS, DEVICES, AND METHODS" dated Oct. 24, 2017, which is herein incorporated by reference in its entirety.

Accordingly, some embodiments are directed to RF antennas for use in micro-localization systems. Some embodiments are directed to RF antennas having asymmetric designs for converting unbalanced signals to balanced signals, while shielding the antenna's emitting element from leakage of electromagnetic energy. As described herein, these types of RF antennas may be advantageously used in a micro-localization system because they enable the use of high-frequency wideband signals (which reduce the impact of multipath on the system's performance), and enable electrical isolation of the RF antenna's emitting element from sources of electromagnetic interference that may otherwise distort the RF antenna's emission pattern (which would reduce the accuracy and robustness of the micro-localization system). The inventors have recognized that it is advantageous to design RF antennas operating in the millimeter or microwave range by using unbalanced lines to drive a balanced emitting element. Unbalanced lines (e.g., coaxial cables) provide increased immunity to electromagnetic interference relative to their balanced counterparts (e.g., twinaxial pairs). As such, unbalanced lines can support high frequencies with lower signal-to-noise ratios, making them preferable over balanced lines for driving the RF antenna. At the same time, balanced lines are often preferable over unbalanced lines in the design of the emitting elements because balanced emitting elements exhibit higher degrees of symmetry in the emission pattern relative to their unbalanced counterparts. Symmetric emission patterns may, in turn, lead to higher localization resolution relative to asymmetric emission patterns.

Accordingly, some embodiments are directed to RF antennas having balanced emitting elements that are driven by unbalanced signals. In some embodiments, the RF antennas include antenna feeds which include an asymmetric antenna portion that facilitates converting unbalanced RF signals to balanced RF signals. However, asymmetric antennas feeds produce electromagnetic radiation that exhibits an asymmetry relative to the axis of the antenna feed. Such electromagnetic radiation may couple to the RF antenna's emitting element and cause distortions in the emission pattern of the antenna's emitting element. In turn, such distortions reduce the performance of the micro-localization system including such an RF antenna.

Accordingly, in some embodiments, the asymmetric portion of an antenna feed of an RF antenna may be electrically shielded from the RF antenna's emitting element so as to reduce or eliminate distortions in the emission pattern caused by leakage of asymmetric electromagnetic radiation emanating from the feed. In some embodiments, the feed may be electrically shielded by placing a conductive wall between the asymmetric portion of the antenna feed and the emitting element. In some embodiments, the antenna feed may include an asymmetric portion and a symmetric portion provided between the asymmetric portion and the emitting element. Placing a symmetric antenna feed between the asymmetric feed and the emitting element results in the emitting element being exposed to symmetric electromagnetic leakage to a greater extent than it is exposed to asymmetric electromagnetic leakage.

In some embodiments, a conductive wall may be included as part of an antenna conductive housing. The conductive wall may be placed between the asymmetric portion of the antenna feed and the emitting element so as to electrically shield the emitting element from asymmetric radiation generated by the asymmetric portion of the antenna feed. The conductive housing may form a pair of cavities separated from each other by the conductive wall. One cavity may include therein the symmetric portion of the antenna feed. This cavity may be positioned proximate the emitting element. The other cavity may include therein the asymmetric portion of the antenna feed. This cavity may be positioned distal from the emitting element. To enable communication between the asymmetric and the symmetric antenna feed portions, an opening may be formed in the conductive wall for allowing passage of the antenna feed therethrough.

In some embodiments, the antenna feed (or at least a portion thereof) may be further designed to provide an impedance match between the impedance of the emitting element and the impedance of the port connecting the RF antenna to other electronic components. Accordingly, in some embodiments, antenna feeds of the types described herein may include tapered regions in which the impedance of the antenna feed varies along its length. These tapers may be shaped such that the width of a conductor disposed on the antenna feed varies along the length of the antenna feed. For example, an antenna feed may include a taper that is wider near the port than it is near the emitting element. In this way, the impedance seen by an RF signal propagating from the port to the emitting element varies gradually along the antenna feed, thus reducing reflections, which may otherwise negatively affect the power efficiency of the antenna.

The inventors have appreciated that multipath interference can severely degrade the performance of micro-localization RF systems, which effect is especially pronounced in indoor environments. Multipath interference arises when RF signals reach the receiving antenna through more than one path due to reflections from the ground and/or other objects in the antenna's environment. Multipath interference leads to unpredictability in the way different reflections are combined with one another (e.g., through constructive interference, destructive interference, partially constructive interference or partially destructive interference). This unpredictability can negatively affect the system's ability to locate objects.

Some embodiments are directed to wideband RF antennas for mitigating multipath interference. The use of wideband antennas can lead to a substantial reduction in the extent to which multiple waves interfere with each other, even when multiple reflections occur. This is due to the fact that different reflected waves are mutually uncorrelated across a wide bandwidth, and therefore have random phase relationships relative to each other. Lacking coherent phase relationships reduces the extent to which the waves interfere thereby reducing or eliminating multipath effects. Accordingly, some embodiments are directed to micro-localization systems equipped with wideband antennas for the transmission and reception of RF signals. Wideband antennas of the types described herein may enable transmission and reception of RF signals with bandwidths between 100 MHz and 10 GHz, between 200 MHz and 10 GHz, between 500 MHz and 10 GHz, between 100 MHz and 5 GHz, between 200 MHz and 5 GHz, between 500 MHz and 5 GHz, between 100 MHz and 1 GHz, between 200 MHz and 1 GHz, between 500 MHz and 1 GHz, among other possible ranges.

II. Systems for Micro-Localization

FIG. 1A illustrates an exemplary micro-localization system 100, in accordance with some embodiments. Micro-localization system 100 comprises a plurality of interrogator devices 102, one or more of which are configured to transmit an RF signal 103 (e.g., RF signals 103a, 103b, 103c, etc.). System 100 also comprises one or more target devices 104 configured to receive RF signals 103 and, in response, transmit RF signals 105 (e.g., RF signals 105a, 105b and 105c, etc.). Interrogator devices 102 are configured to receive RF signals 105 that are then used to determine distances between respective interrogator and target devices. The computed distances may be used to determine the location of one or more target devices 104. It should be appreciated that while multiple target devices 104 are illustrated in FIG. 1A, a single target device may be utilized in some circumstances. More generally, it should be appreciated that any number of interrogator devices 102 and target devices 104 may be used, as the aspects of the technology described herein are not limited in this respect.

Micro-localization system 100 may also include a controller 106 configured to communicate with interrogator devices 102 and target devices 104 via communication channel 108, which may include a network, device-to-device communication channels, and/or any other suitable means of communication. Controller 106 may be configured to coordinate the transmission and/or reception of RF signals 103 and 105 between desired interrogator and target devices via communication channels 107a, 107b and 108, which may be a single communication channel or include multiple communication channels. Controller 106 may also be configured to determine the location of one or more target devices 104 from information received from interrogator devices 102. Controller 106 may be implemented as a standalone controller or may be implemented in full or in part by one or more interrogator devices 102 and/or target devices 104.

According to some embodiments, one or more interrogator devices transmit first RF signals (e.g., RF signals 103) having a first center frequency and, in response to receiving the first RF signals, one or more target devices transmit second RF signals (e.g., RF signals 105) having a second center frequency different from the first center frequency. In this manner, receive antennas on the one or more interrogator devices can be configured to respond to RF signals about the second center frequency, improving the ability of the interrogator devices to receive RF signals from target devices in cluttered and/or noisy environments.

In some embodiments, relatively simple and/or cost effective circuitry could be implemented at the target device to transform RF signals having a first center frequency received from an interrogator device to RF signals having a second center frequency different from the first center frequency for transmission. According to some embodiments, the second center frequency is harmonically related to the first center frequency. For example, in system 100 illustrated in FIG. 1A, a target device 104 may be configured to transform RF signals 103 and transmit RF signals 105 at a harmonic of the center frequency of the received RF signal 103. According to other embodiments, a target device transforms RF signals having a first center frequency received from an interrogator device to RF signals having second center frequency that is different from, but not harmonically related to the first center frequency. In other embodiments, a target device is configured to generate RF signals at a second center frequency different from the first center frequency, either harmonically or not harmonically related, rather than transforming RF signals received from an interrogator device.

Figure 1B:
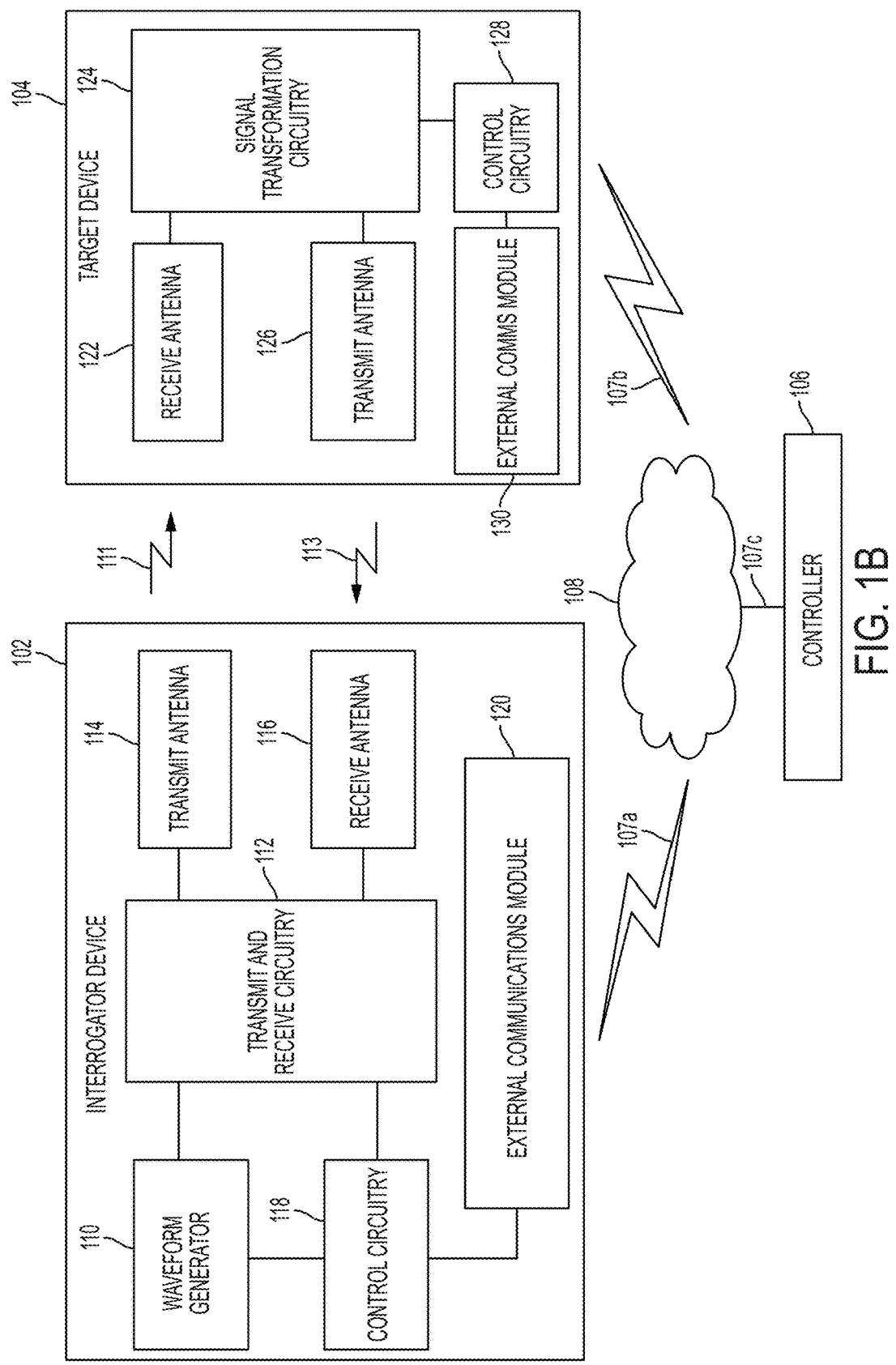
FIG. 1B shows illustrative components of an interrogator device and a target device, which are part of the illustrative system 100 shown in FIG. 1A, in accordance with some embodiments of the technology described herein.

FIG. 1B shows illustrative components of an illustrative interrogator device 102 and a illustrative target device 104, which are part of the illustrative system 100 shown in FIG. 1A, in accordance with some embodiments of the technology described herein. As shown in FIG. 1B, illustrative interrogator device 102 includes waveform generator 110, transmit and receive circuitry 112, transmit antenna 114, receive antenna 116, control circuitry 118, and external communications module 120. It should be appreciated that, in some embodiments, an interrogator device may include one or more other components in addition to or instead of the components illustrated in FIG. 1B. Similarly, in some embodiments, a target device may include one or more other components in addition to or instead of the components illustrated in FIG. 1B.

In some embodiments, waveform generator 110 may be configured to generate RF signals to be transmitted by the interrogator 102 using transmit antenna 114. Waveform generator 110 may be configured to generate any suitable type(s) of RF signals. In some embodiments, waveform generator 110 may be configured to generate frequency modulated RF signals, amplitude modulated RF signals, and/or phase modulated RF signals. Non-limiting examples of modulated RF signals, any one or more of which may be generated by waveform generator 110, include linear frequency modulated signals (also termed "chirps"), non-linearly frequency modulated signals, binary phase coded signals, signals modulated using one or more codes (e.g., Barker codes, bi-phase codes, minimum peak sidelobe codes, pseudo-noise (PN) sequence codes, quadri-phase codes, poly-phase codes, Costas codes, Welti codes, complementary (Golay) codes, Huffman codes, variants of Barker codes, Doppler-tolerant pulse compression signals, impulse waveforms, noise waveforms, and non-linear binary phase coded signals). Waveform generator 110 may be configured to generate continuous wave RF signals or pulsed RF signals. Waveform generator 110 may be configured to generate RF signals of any suitable duration (e.g., on the order of microseconds, milliseconds, or seconds).

In some embodiments, waveform generator 110 may be configured to generate microwave and/or millimeter wave RF signals. For example, waveform generator 110 may be configured to generate RF signals having a center frequency in a given range of microwave and/or millimeter frequencies (e.g., 4-7.5 GHz, 8-15 GHz, 50-70 GHz). It should be appreciated that an RF signal having a particular center frequency is not limited to containing only that particular center frequency (the RF signal may have a non-zero bandwidth). For example, waveform generator 110 may be configured to generate a chirp having a center frequency of 60 GHz whose instantaneous frequency varies from a lower frequency (e.g., 59 GHz) to an upper frequency (e.g., 61 GHz). Thus, the generated chirp has a center frequency of 60 GHz and a bandwidth of 2 GHz and includes frequencies other than its center frequency.

In some embodiments, waveform generator 110 may be configured to generate RF signals using a phase locked loop. In some embodiments, the waveform generator may be triggered to generate an RF signal by control circuitry 118 and/or in any other suitable way.

In some embodiments, transmit and receive circuitry 112 may be configured to provide RF signals generated by waveform generator 110 to transmit antenna 114. Additionally, transmit and receive circuitry 112 may be configured to obtain and process RF signals received by receive antenna 116. In some embodiments, transmit and receive circuitry 112 may be configured to: (1) provide a first RF signal to the transmit antenna 114 for transmission to a target device (e.g., RF signal 111); (2) obtain a responsive second RF signal received by the receive antenna 116 (e.g., RF signal 113) and generated by the target device in response to the transmitted first RF signal; and (3) process the received second RF signal by mixing it (e.g., using a frequency mixer) with a transformed version of the first RF signal. The transmit and receive circuitry 112 may be configured to provide processed RF signals to control circuitry 118, which may (with or without performing further processing the RF signals obtained from circuitry 112) provide the RF signals to external communications module 120.

As described further below, each or some of transmit antennas 114 and 126 and receive antennas 116 and 122 may be designed to reduce range errors so as to improve the system's accuracy in localizing objects. Additionally, or alternatively, each or some of transmit antennas 114 and 126 and receive antennas 116 and 122 may be designed to reduce range error variability, thus allowing the system to accurately localize objects regardless of the location of the object relative to the corresponding interrogator(s).

In some embodiments, transmit antenna 114 may be configured to radiate RF signals circularly polarized in one rotational direction (e.g., clockwise) and the receive antenna 116 may be configured to receive RF signals circularly polarized in another rotational direction (e.g., counter-clockwise). In some embodiments, transmit antenna 114 may be configured to radiate RF signals having a first center frequency (e.g., RF signal 111 transmitted to target device 104) and the receive antenna may be configured to receive RF signals having a second center frequency different from (e.g., a harmonic of) the first center frequency (e.g., RF signal 113 received from target device 104 and generated by target device 104 in response to receiving the RF signal 111).

In some embodiments, transmit antenna 114 and receive antenna 116 are physically separate antennas. In other embodiments, however, the interrogator 102 may include a dual mode antenna configured to operate as a transmit antenna in one mode and as a receive antenna in another mode.

In some embodiments, control circuitry 118 may be configured to trigger the waveform generator 110 to generate an RF signal for transmission by the transmit antenna 114. The control circuitry 118 may trigger the waveform generator in response to a command to do so received by external communications interface 120 and/or based on logic part of control circuitry 118.

In some embodiments, control circuitry 118 may be configured to receive RF signals from transmit and receive circuitry 112 and forward the received RF signals to external communications interface 120 for sending to controller 106. In some embodiments, control circuitry 118 may be configured to process the RF signals received from transmit and receive circuitry 112 and forward the processed RF signals to external communications interface 120. Control circuitry 118 may perform any of numerous types of processing on the received RF signals including, but not limited to, converting the received RF signals to from analog to digital (e.g., by sampling using an ADC), performing a Fourier transform to obtain a time-domain waveform, estimating a time of flight between the interrogator and the target device from the time-domain waveform, and determining an estimate of distance between the interrogator 102 and the target device that the interrogator 102 interrogated. The control circuitry 118 may be implemented in any suitable way and, for example, may be implemented as an application specific integrated circuit (ASIC), a field programmable gate array (FPGA), a combination of logic circuits, a microcontroller, or a microprocessor.

External communications module 120 may be of any suitable type and may be configured to communicate according to any suitable wireless protocol(s) including, for example, a Bluetooth communication protocol, an IEEE 802.15.4-based communication protocol (e.g., a "ZigBee" protocol), and/or an IEEE 802.11-based communication protocol (e.g., a "WiFi" protocol).

As shown in FIG. 1B, target device 104 includes receive antenna 122, signal transformation circuitry 124, transmit antenna 126, control circuitry 128, and external communications module 130.

In some embodiments, receive antenna 122 may be configured to receive RF signals circularly polarized in one rotational direction (e.g., clockwise) and the transmit antenna 126 may be configured to transmit RF signals circularly polarized in another rotational direction (e.g., counter-clockwise).

In some embodiments, receive antenna 122 may be configured to receive RF signals having a first center frequency. The received RF signals may be transformed by signal transformation circuitry 124 to obtained transformed RF signals having a second center frequency different from (e.g., a harmonic of) the first center frequency. The transformed RF signals having the second center frequency may be transmitted by transmit antenna 126.

In some embodiments, each of the transmit and/or the receive antennas on an interrogator may be directional antennas. This may be useful in applications where some information is known about the region of space in which the target device is located (e.g., the target device is located in front of the interrogator, to the front left of the interrogator, etc.). Even if the target device is attached to a moving object (e.g., an arm of an industrial robot, a game controller), the movement of the target device may be constrained so that the target device is always within a certain region of space relative to the interrogator so that using directional antennas to focus on that region of space increases the sensitivity of the interrogator to signals generated by the target device. In turn, this increases the distance between the interrogator and target device at which the micro-localization system may operate with high accuracy. However, it should be appreciated that in some embodiments, the antennas on an interrogator may be isotropic (omnidirectional), as aspects of the technology describe herein are not limited in this respect.

In some embodiments, each of the transmit and/or the receive antennas on the target device may be isotropic so that the target device may be configured to receive signals from and/or provide RF signals to an interrogator located in any location relative to the target device. This is advantageous because, in some applications of micro-localization, the target device may be moving and its relative orientation to one or more interrogators may not be known in advance. However, in some embodiments, the antennas on a target device may be directional (anisotropic), as aspects of the technology describe herein are not limited in this respect.

In some embodiments, control circuitry 128 may be configured to turn the target device 104 on or off (e.g., by powering off one or more components in signal transformation circuitry 124) in response to a command to do so received via external communications interface 130. The control circuitry 128 may be implemented in any suitable way and, for example, may be implemented as an application specific integrated circuit (ASIC), a field programmable gate array (FPGA), a combination of logic circuits, a microcontroller, or a microprocessor. External communications module 130 may be of any suitable type including any of the types described herein with reference to external communications module 120.

As described above with reference to FIG. 1A, multiple interrogator devices may be utilized in order to determine a location of a target device. In some embodiments, each of the interrogator devices may be configured to transmit an RF signal to a target device, receive a responsive RF signal from the target device (the responsive signal may have a different polarization and/or a different center frequency from the signal that was transmitted), and process the transmitted RF signal together with the received RF signal to obtain an RF signal indicative of the distance between the interrogator device and the target device. The RF signals indicative of the distances between the interrogator devices and the target device may be processed (e.g., by the interrogators or another processor) to obtain estimates of the distances between the target device and each of the interrogators. In turn, the estimated distances may be used to determine the location of the target device in 3D space.

In some embodiments, more than two interrogators may be used to interrogate a single target device. In such embodiments, estimates of distances between the target device and each of the three or more interrogators may be used to obtain the 2D location of the target devices (e.g. to specify a 2D plane containing the 3D target devices). When distances between at least three interrogator devices and a target device are available, then the 3D location of the target device may be determined.

Figure 1C:
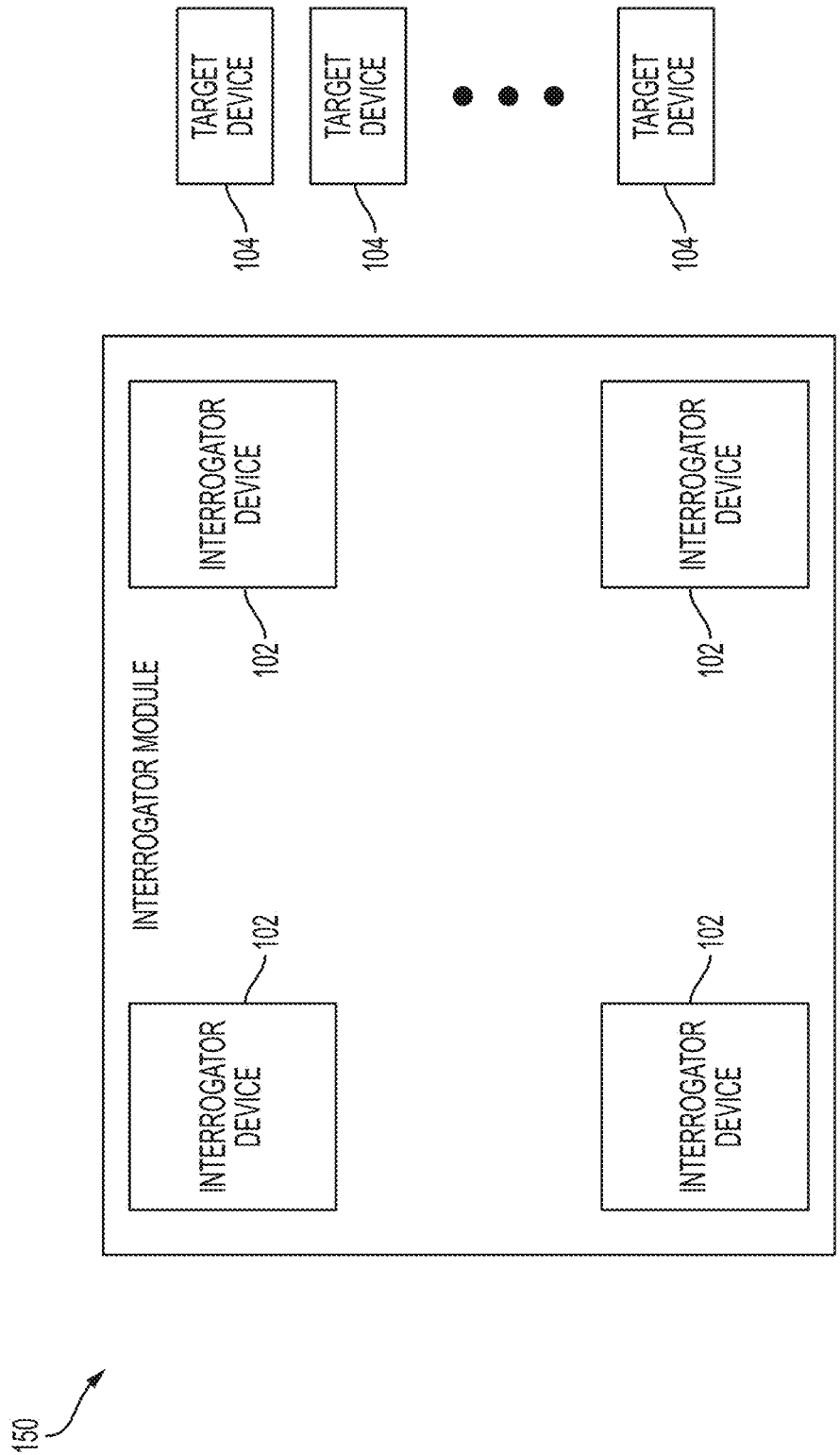
FIG. 1C shows another illustrative system 150 that may be used to implement RF localization techniques, in accordance with some embodiments of the technology described herein.

FIG. 1C shows an illustrative system 150 that may be used to implement RF micro-localization techniques, in accordance with some embodiments of the technology described herein. The illustrative system 150 comprises a plurality of interrogators 102, which are part of a interrogator module 140. The interrogators 102 may be used to obtain estimates of distance to one or more of the target devices 104. In turn, these distance estimates (e.g., together with the known locations of the interrogators relative to one another) may be used to estimate the location(s) of the target device(s) 104.

In some embodiments, interrogator module 140 may comprise a printed circuit board (PCB) or other mechanical supports, on which the interrogators 102 may be disposed. The interrogator module 140 may be part of any product (e.g., any consumer or commercial product). The PCB or other mechanical support may be rigid or flexible. For example, the interrogator module 140 may be a computer (e.g., a desktop, a laptop, a tablet, a personal digital assistant, etc.) and the PCB may be a motherboard in the computer. As another example, interrogator module 140 may be a smartphone and the PCB may be a rigid board or a flex circuit within the smartphone. As another example, interrogator module 140 may be a camera (e.g., video camera, a camera for taking still shots, a digital camera, etc.) and the PCB may be a circuit board within the camera. As another example, the interrogator module 140 may be a gaming system and the PCB may be a circuit board within the gaming system. As another example, the PCB may comprise a flexible circuit ribbon having one or more interrogators disposed thereon, which ribbon may be within interrogator module 140, affixed to the side of interrogator module 140 (e.g., on the side of a gaming system), or affixed near the interrogator module 140 (e.g., affixed on a wall in a room containing the product).

Each interrogator 102 shown in FIG. 1C may be of any suitable type described herein. In some embodiments, the interrogators 102 may be of the same type of interrogator. In other embodiments, at least two of these interrogators may be of different types. Some or all the interrogators 102 may be designed as described in connection with FIG. 1B, though in some embodiments, some of the components (e.g., waveform generator 110, control circuitry 118, external communications module 120 and/or transmit and receive circuitry 112) may be shared among multiple interrogators 102.

Although there are four interrogators shown as part of interrogator module 140, in other embodiments, any other suitable number of interrogators may be used (e.g., one, two, three, four, five, six, seven, eight, nine, ten, etc.), as aspects of the technology described herein are not limited in this respect. For example, in some embodiments, one interrogator 102 may be configured to transmit RF signals to a target device 104 and receive RF signals from the same target device, whereas the other interrogators 102 may be receive-only interrogators configured to receive RF signals from the target device 104, but which are not capable of transmitting RF signals to target device 104 (e.g., because these interrogators may not include transmit circuitry for generating RF signals for transmission by a transmit antenna and/or the transmission antenna). It should also be appreciated that each of target devices 104 may be of any suitable type(s) described herein, as aspects of the technology described herein are not limited in this respect.

III. Examples of RF Antennas

Some embodiments are directed to RF antennas having asymmetric designs for converting unbalanced signals to balanced signals while at the same time shielding the antenna's emitting element from leakage of electromagnetic energy.

For example, some embodiments provide an RF antenna having a conductive housing forming a first cavity separated from a second cavity by a conductive wall. In some embodiments, the RF antenna may include an emitting element coupled to the conductive housing, a port coupled to the conductive housing, and an antenna feed electrically coupling the emitting element to the port. In some embodiments, the antenna feed may pass through the first and second cavities and through the conductive wall.

In some embodiments, the antenna feed may include a symmetric portion in contact with the emitting element and an asymmetric portion in contact with the port. The symmetric portion may be at least partially (or, in some embodiments, entirely) in the cavity proximal to the emitting element. The asymmetric portion may be at least partially (or, in some embodiments, entirely) in the cavity distal from the emitting element. The asymmetric portion of the antenna feed may serve as balanced-to-unbalanced converter between the port and the emitting element. The symmetric portion of the antenna feed may be placed between the asymmetric portion and the emitting element to prevent or reduce coupling of asymmetric electromagnetic radiation to the emitting element. In some embodiments, the conductive wall may further reduce the extent to which asymmetric radiation reaches the emitting element.

Figure 2:
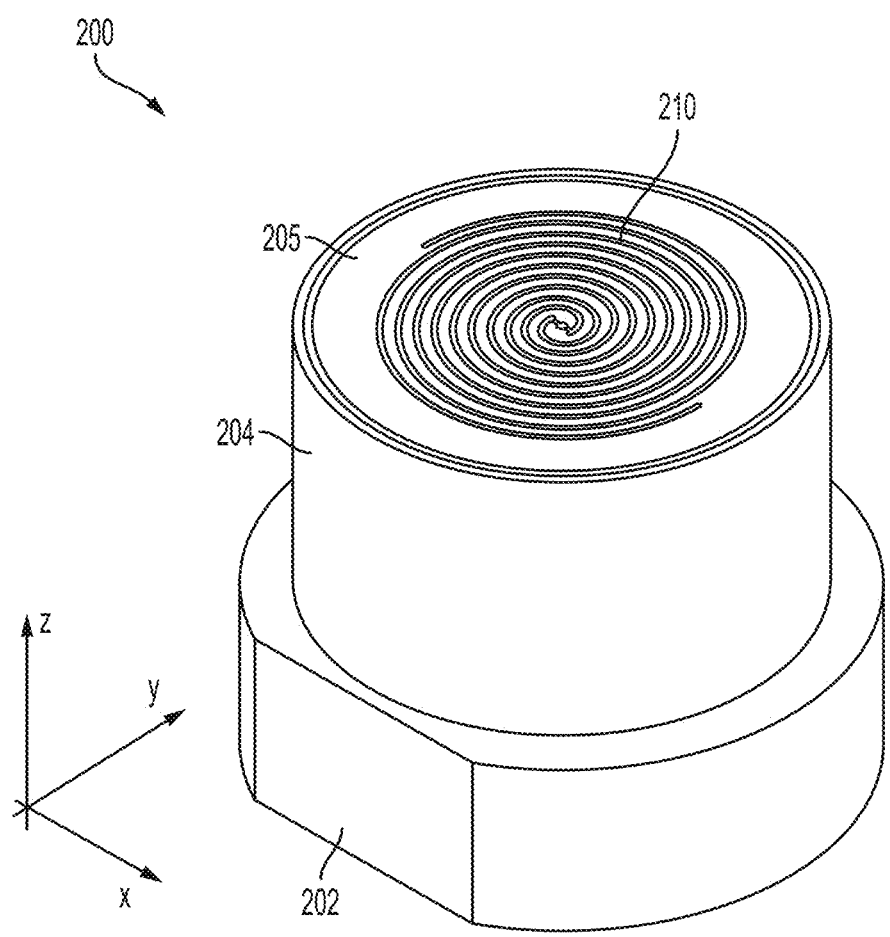
FIG. 2 is an isometric view of a illustrative RF antenna that may be used in the interrogator device and/or target device of FIG. 1B, in accordance with some embodiments of the technology described herein.

FIG. 2 is an isometric view of an illustrative RF antenna 200, in accordance with some embodiments. The RF antenna 200 may be used as part of a micro-localization system and, for example, may be used as any one of transmit antennas 114 or 126, or receive antennas 116 or 122 (see FIG. 1B), in accordance with some embodiments. As shown in FIG. 2, RF antenna 200 includes a conductive housing having conductive housing portions 202 and 204 and an emitting element 210 disposed on a dielectric substrate 205. Conductive housing portions 202 and 204 may be separable pieces of conductive material or may be made from a single piece of conductive material. Conductive housing portions 202 and 204 may be made of any suitable conductive material, including but not limited to aluminum, steel, stainless steel, copper, or any alloy thereof. In the example of FIG. 2, conductive housing portions 202 and 204 have cylindrical shapes, though not all embodiments are limited in this respect. In this example, the cylindrically shaped conductive housing portions have respective axes that are parallel to the z-axis. Housing portion 204 may be positioned between conductive housing portion 202 and emitting element 210.

In some embodiments, emitting element 210 is configured as part of a transmitter and/or as part of a receiver of electromagnetic radiation. That is, emitting element 210 may emit electromagnetic radiation, thus serving as part of a transmitter and/or may receive electromagnetic radiation, thus serving as part of a receiver. Emitting element 210 may be designed to emit and/or receive wideband signals. For example, emitting element 210 may emit (and/or receive) signals in the 4 GHz-7.5 GHz range and/or may receive (and/or transmit) signals in the 8 GHz-15 GHz range. In some embodiments, emitting antenna 210 may be designed to emit signals having a circular polarization or an elliptical polarization.

Being configured to emit and/or receive electromagnetic radiation, emitting element 210 may serve as interface between RF waves traveling in space and electric currents flowing in the RF antenna 200. Dielectric substrate 205, on which emitting element 210 is disposed, may be made of any suitable insulating material including for example Teflon, FR-4, FR-1, CEM-1, CEM-3, among other possible examples. In the example of FIG. 2, dielectric substrate 205 lies in the xy-plane, and has a round shape. However, not all embodiments are limited in this respect, as dielectric substrate 205 may have an elliptical shape, a square shape, a rectangular shape, or an irregular shape, and/or may not lie in the xy-plane. In some embodiments, dielectric substrate 205 may be positioned in an opening of conductive housing portion 204, and may be held in place by the side walls of conductive housing portion 204.

In some embodiments, emitting element 210 may be a monopole emitting element, a dipole emitting element, a patch emitting element, a loop emitting element, a resonant emitting element, an Archimedean spiral emitting element, an exponential spiral emitting element, a sinuous emitting element, a log-periodic emitting element and/or any other suitable type of emitting element. One example of an emitting element can be seen in FIG. 3A, a top view of RF antenna 200, in accordance with some embodiments. In this example, emitting element 210 includes a pair of conductive traces ($211_A$ and $211_B$) formed on substrate 205. It should be appreciated that any other suitable number of conductive traces may be used for emitting element 210, such as three, four, eight, or sixteen. Conductive traces $211_A$ and $211_B$ may each have multiple loops. The loops may be arranged, for example, in an interleaved fashion such that at least one loop of conductive trace $211_A$ is between two adjacent loops of conductive trace $211_B$ and at least one loop of conductive trace $211_B$ is between two adjacent loops of conductive trace $211_A$. In one example, conductive traces $211_A$ and $211_B$ have spiral shapes, with the spirals being intertwined.

In some embodiments, each one of conductive traces $211_A$ and $211_B$ may receive a drive signal (e.g., an electric current) for causing emission of electromagnetic radiation. In some embodiments, the electric signals driving the conductive traces $211_A$ and $211_B$ may be balanced (e.g., differential). In these embodiments, emitting element 210 operates as a balanced emitting element. In some embodiments, an opening 209 is formed on dielectric substrate 205. Opening 209 may be configured to receive therethrough a pair of conductors (not shown in FIG. 3A) passing through RF antenna 200's conductive housing. Each of the conductors may be placed in contact with a respective conductive trace. To enable these connections, one end of conductive trace $211_A$ may be adjacent one side of opening 209 and one end of conductive trace $211_B$ may be adjacent the opposite side of opening 209. In this way, when the pair of conductors is inserted in opening 209, each conductor contacts the corresponding conductive trace, but not the other conductive trace. In other embodiments, multiple openings 209 may be formed on dielectric substrate 205 to enable passage of multiple conductors. In one of these embodiments, one conductor passes through an opening 209 and contacts conductive trace $211_A$, and another conductor passes through another opening 209 and contacts conductive trace $211_B$.

Figure 3B:
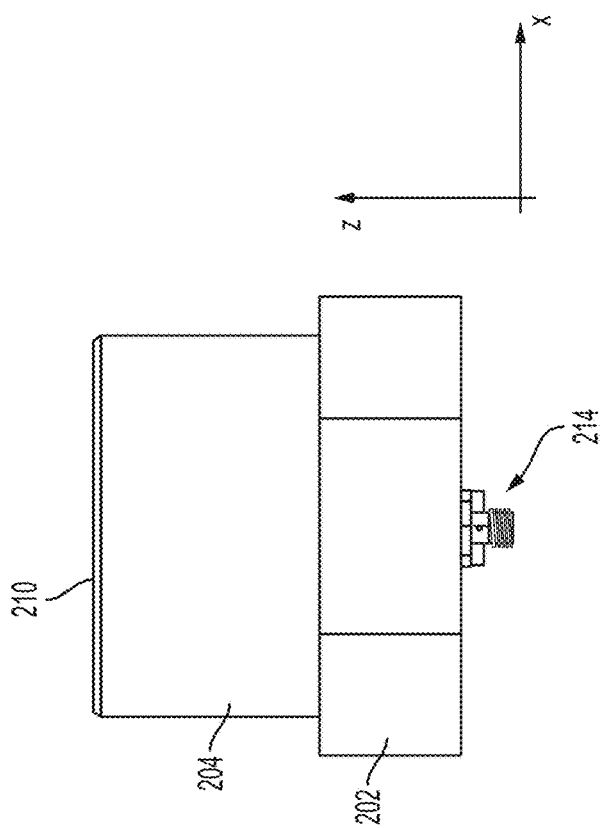
FIG. 3B is a side view of the illustrative RF antenna of FIG. 2, in accordance with some embodiments of the technology described herein.
Figure 3A:
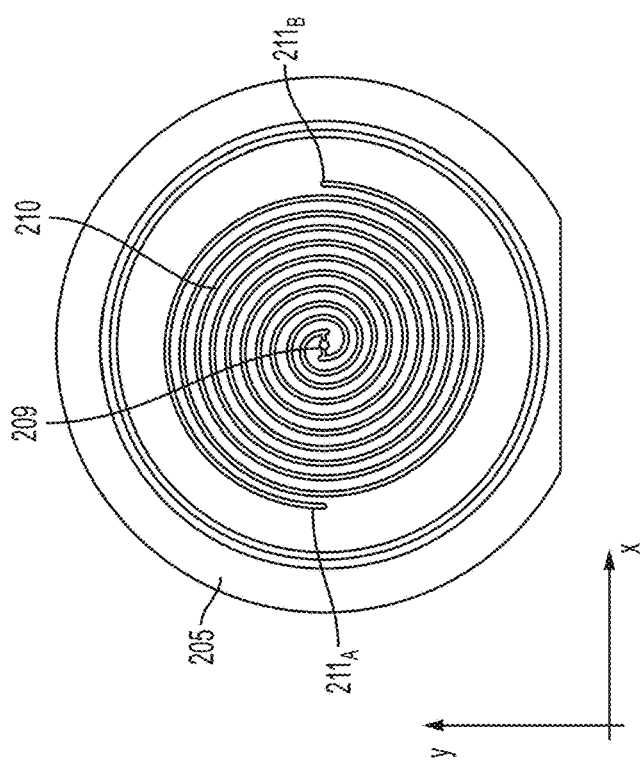
FIG. 3A is a top view of the illustrative RF antenna of FIG. 2, in accordance with some embodiments of the technology described herein.

FIG. 3B is a side view of RF antenna 200, in accordance with some embodiments. As shown, RF antenna 200 includes a port 214 arranged to enable communication between RF antenna 200 and other electronic components (e.g., transmit and receive circuitry 112 or signal transformation circuitry 124, shown in FIG. 1B). Port 214 may be disposed at the opposite end of RF antenna 200 relative to emitting element 210 in the z-axis. In some embodiments, port 214 is designed to allow connection of unbalanced lines (e.g., coaxial cables) to RF antenna 200, though in other embodiments port 214 may allow connection of balanced lines to RF antenna 200. Port 214 may include an inner shaped arranged to contact the electric core of an unbalanced line, and an outer conductor shaped to contact the metallic shield of the unbalanced line. In one example, port 214 may be an SMA connector (e.g., K type or V type), though other suitable connectors configured to support frequencies greater than 1 GHz may be used. Port 214 may have a 50Ω-impedance or a 60Ω-impedance or any impedance value between 40Ω and 60Ω, in some embodiments. The lower wall of conductive housing portion 202 may include an opening (not shown in FIG. 3B) for allowing insertion and attachment of port 214.

In some embodiments, an antenna feed may be used to place port 214 in electric communication with emitting element 210. The antenna feed may include two conductors in some embodiments. One conductor of the antenna feed may electrically couple conductive trace $211_A$ to the inner conductor of port 214 and the other conductor of the antenna feed may electrically couple conductive trace $211_B$ to the outer conductor of port 214.

In some embodiments, emitting element 210 may be designed in a balanced configuration, such that conductive traces $211_A$ and $211_B$ carry electric currents in opposite directions. On the other hand, the lines carrying RF signals between port 214 and other electronic components disposed outside RF antenna 200 may be unbalanced and may be arranged such that one conductor serves as the signal line and another conductor serves as the ground line. Coaxial cables, for example, are arranged in this manner. As described above, unbalanced cables may be preferred over balanced cables because they may provide higher immunity to electromagnetic interference, and lead to higher signal-to-noise-ratio at high frequencies.

Figure 4A:
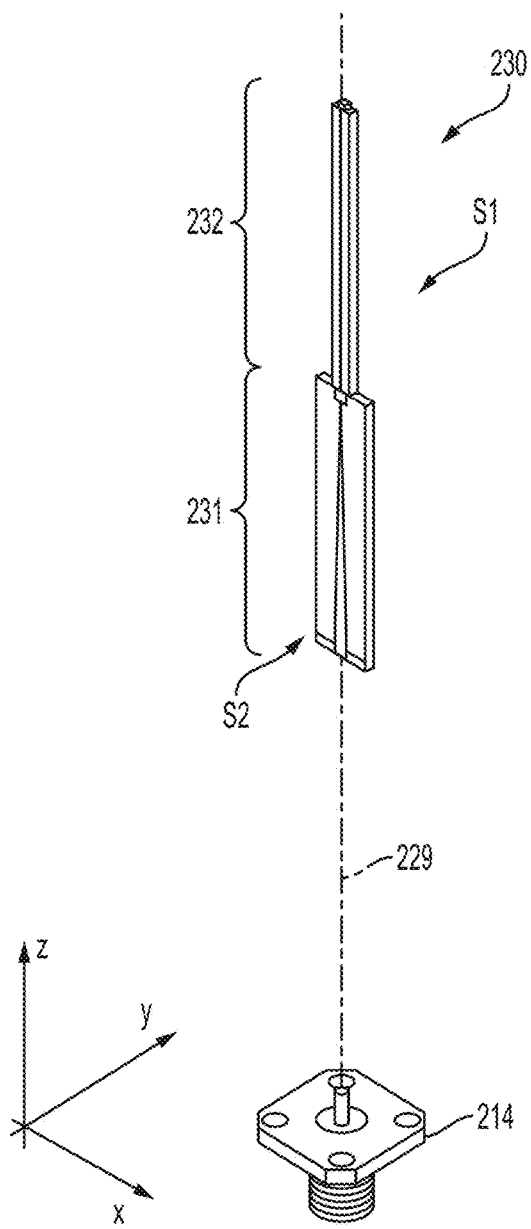
FIG. 4A is an isometric view illustrating an antenna feed and a port that may be used with the illustrative RF antenna of FIG. 2, in accordance with some embodiments of the technology described herein.

The antenna feeds described herein are configured, in some embodiments, to convert balanced signals into unbalanced signals, and vice versa. Accordingly, the antenna feeds of the types described herein may serve as baluns (balanced to unbalanced converters). One illustrative antenna feed for electrically coupling port 214 to emitting element 210 is shown in FIG. 4A, in accordance with some embodiments. Antenna feed 214 may pass through the interior of conductive housing portions 202 and 204 (not shown in FIG. 4A). In this exploded view, antenna feed 230 is illustrated as being separated from port 214. When mounted in the RF antenna 200, however, antenna feed 230 contacts port 214 (as shown on FIG. 4B).

In the example of FIG. 4A, antenna feed 230 extends along axis 229, which is parallel to the z-axis. Antenna feed 230 includes antenna feed portions 231 and 232, which are offset relative to each other along the z-axis in this example. In some embodiments, including the embodiments illustrated in FIGS. 5A and 5B, antenna feed portion 231 passes through a cavity formed in conductive housing portion 202 and antenna feed portion 232 passes through a cavity formed in conductive housing portion 204.

Figure 4B:
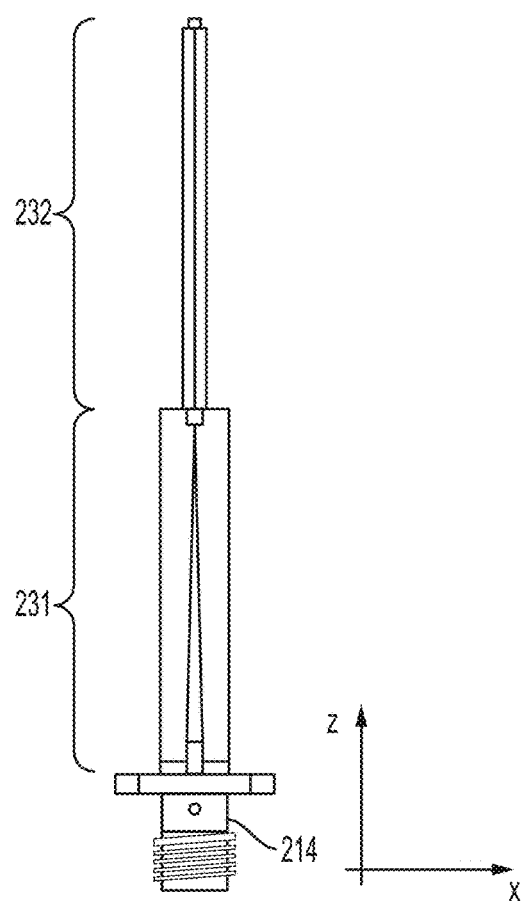
FIG. 4B is a side view of the illustrative RF antenna feed of FIG. 4A, in accordance with some embodiments of the technology described herein.

As shown in FIG. 4B, one end of antenna feed 230 contacts port 214 and the opposite end of antenna feed 230 contacts emitting element 210. As illustrated in FIG. 4B, antenna feed 230 includes two opposing surfaces S1 and S2. One surface faces in one direction and the other surface faces in the opposite direction. In this example, surface S1 lies in the xz-plane and faces along the y-axis in the positive direction, and surface S2 lies in the xz-plane and faces along the y-axis in the negative direction. Each of the two opposite surfaces of antenna feed 230 includes a conductor formed thereon.

Figure 5B:
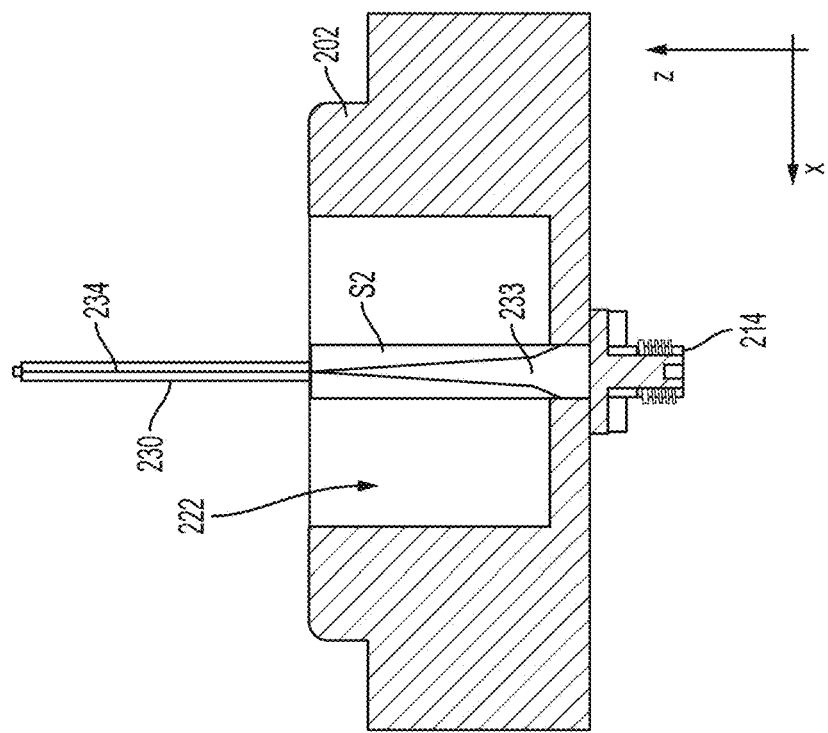
FIG. 5B is a cross sectional view of the illustrative RF antenna of FIG. 2 illustrating a second surface of the antenna feed, in accordance with some embodiments of the technology described herein.
Figure 5A:
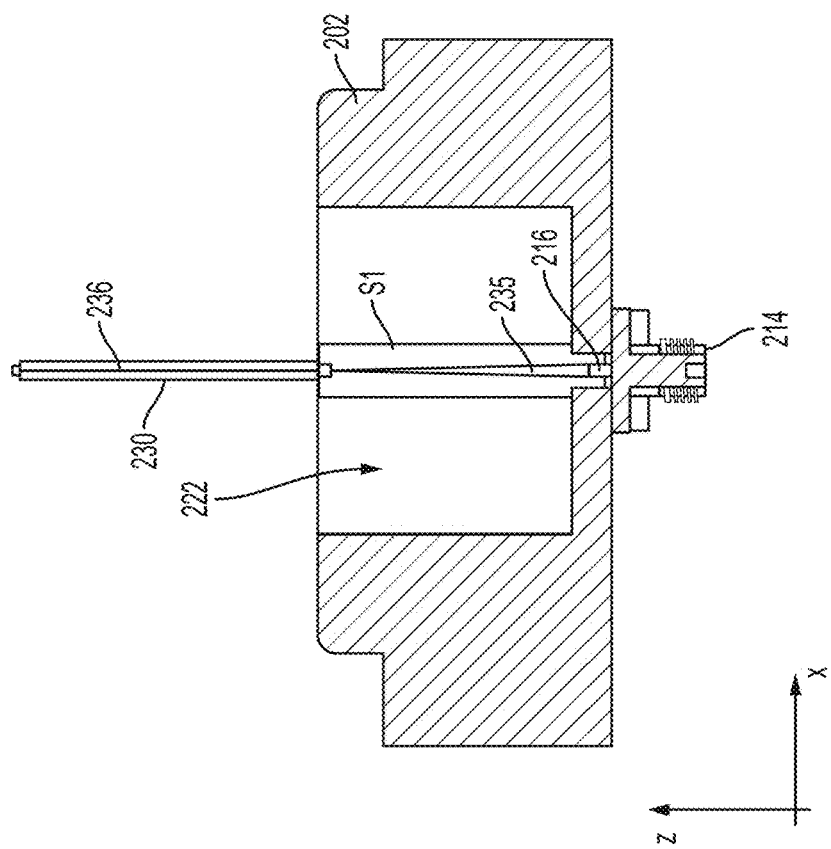
FIG. 5A is a cross sectional view of the illustrative RF antenna of FIG. 2 illustrating a first surface of an antenna feed, in accordance with some embodiments of the technology described herein.

The two opposite surfaces of antenna feed 230, and the respective conductors, are illustrated in FIGS. 5A-5B. FIG. 5A is a cross sectional view of RF antenna 200 in the xz-plane facing in the negative y-axis direction, and FIG. 5B is a cross sectional view of RF antenna 200 in the xz-plane facing in the positive y-axis direction. As shown, antenna feed 230 passes through a cavity 222 formed in the conductive housing portion 202. The outer walls of conductive housing portion 202, which surround cavity 222, may be designed to shield antenna feed 230 from electromagnetic interference. Electromagnetic interference may arise due to the fact that antenna feed 230 may leak electromagnetic radiation. In other words, electric currents flowing through the antenna feed 230 may generate unwanted electromagnetic waves radiating outwardly from the antenna feed 230. However, the conductive walls surrounding cavity 222 may prevent electromagnetic radiation emitted by the antenna feed 230 from reaching the exterior of RF antenna 200. In addition, the conductive walls surrounding cavity 222 may prevent electromagnetic radiation generated outside RF antenna 200 from reaching antenna feed 230 that may otherwise interfere with (and negatively affect the integrity of) the electric currents flowing from and to emitting element 210.

The surface of antenna feed 230 illustrated in FIG. 5A (surface S1) includes conductors 235 and 236. For example, conductors 235 and 236 may be conductive traces patterned on surface S1. In some embodiments, conductors 235 and 236 are made of a single commonly patterned conductive trace. Conductor 235 is in electrical contact with the inner conductor 216 of port 214. Inner conductor 216 is also shown in FIG. 5C, which illustrates a top view of port 214. Conductor 236 has one end in contact with conductive trace $211_A$ and one end in contact with conductor 235.

As shown in FIG. 5A, conductor 235 has a tapered shape. In some embodiments, the shape of the taper is designed to perform an impedance matching function. For example, in some embodiments, the shape of the taper may be selected to vary the impedance of conductor 235 along its length to match the impedance of port 214 to the impedance of emitting element 210. Specifically, the taper may be wider at the bottom (close to port 214) than it is at the top (closer to conductor 230), though not all embodiments are limited in this respect as the opposite arrangement is also possible. In some embodiments, the taper may be an exponential taper, a linear taper, a quadratic taper, etc. An exponential taper may be such that the width of the conductive trace varies with an exponential profile along the length of the antenna feed 230. In some embodiments, exponential tapers may be desirable as they may reduce the length of the taper, and as a result, reduce the height of the conductive housing. The taper may match the impedance of port 214 (e.g., between 40Ω and 60Ω, or between 45Ω and 55Ω, including 50Ω) to the impedance of emitting element 210 (e.g., between 277Ω and 450Ω).

In the example of FIG. 5A, conductor 235 is formed on antenna feed portion 231, which is disposed inside cavity 222, and conductor 236 is formed on antenna feed portion 232, which is disposed inside a cavity formed in conductive housing portion 202. In some embodiments, conductor 236 has a constant width in the x-axis along its length from one end to the other. In other words, the tapered conductor is formed entirely on antenna feed portion 231 and the conductor having constant width is formed entirely on antenna feed portion 232. Not all embodiments, however, are limited in this respect. In other embodiments, for example, a portion of the taper may extend on antenna feed portion 232. In yet other embodiments, the entire length of the conductor from port 214 to emitting element 210 may be tapered.

As used herein, the expression "tapered portion" of the antenna feed refers to a region of antenna feed 230 having at least one tapered conductor. The tapered portion may be formed entirely on antenna feed portion 231, or may formed in part on antenna feed portion 231 and in part on antenna feed portion 232. Similarly, the expression "untapered portion" of the antenna feed refers to the region of antenna feed 230 having no tapered conductors. The untapered portion may be formed entirely on antenna feed portion 232, or may formed in part on antenna feed portion 232 and in part on antenna feed portion 231.

FIG. 5B illustrates surface S2 of antenna feed 230. Surface S2 includes conductors 233 and 234. For example, conductors 233 and 234 may be conductive traces patterned on surface S2. One end of conductor 233 contacts port 214's outer conductor 215 (see FIG. 5C) and the other end of conductor 233 contacts conductor 234. Conductor 234 contacts conductive trace $211_B$. As described in connection with conductor 235, conductor 233 may have a tapered shape for purposes of impedance matching. Conductor 234 may have a constant width along its length. Conductor 233 may formed, entirely or in part, on antenna feed portion 231 and conductor 234 may formed, entirely or in part, on antenna feed portion 232. In other embodiments, the entire length of the conductor from port 214 to emitting element 210 is tapered.

As shown in FIG. 5C, the perimeter of inner contact 216 is less than the perimeter of outer contact 215. This arrangement is due to the fact that port 214 connects to an unbalanced line (e.g., coaxial cable). Due to the difference in the perimeters of the inner and outer contacts, an asymmetry in the arrangement of antenna feed 230 is introduced to enable antenna feed 230 to simultaneously contact inner contact 216 and outer contact 215. In some embodiments, the asymmetry is such that the bottom part (the part closer to port 214) of conductor 233 is wider in the x-axis than the bottom part of conductor 235. Specifically, the bottom part of conductor 233 may be sufficiently wide to contact outer conductor 215 (without contacting inner conductor 216), while the bottom part of conductor 235 may be sufficiently narrow to contact inner conductor 216 (without contacting outer conductor 215). As such, the shape of conductor 233 is different from that of conductor 235, and the lower region of antenna feed 230 is 180°-rotationally asymmetric with respect to axis 229. In this region, the conductor of surface S1 and the conductor of surface S2 may have different shapes.

In some embodiments, some of the electromagnetic radiation that leaks out of the antenna feed 230 may couple to emitting element 210. As a result, antenna feed 230 is coupled to emitting element 210, in addition to electric currents flowing in antenna feed 230, indirectly via electromagnetic radiation traveling in the interior of RF antenna 200. As described above, this coupling may alter the radiation pattern of emitting element 210, thus negatively affecting the resolution of a micro-localization system using RF antenna 200.

Asymmetries in the electromagnetic radiation generated via leakage in the asymmetric portion of the antenna feed 230 lead to asymmetries in the way electromagnetic radiation is emitted by the antenna feed. When coupled to emitting element 210, in fact, such asymmetries may lead to imbalances in the manner in which emitting element 210 is excited. For example, certain portions of conductive trace $211_A$ may be excited with different phases and/or intensities relative to the corresponding portions of conductive trace $211_B$. This, in turn, may result in asymmetries in the emission pattern of emitting element 210, and therefore to variability in the positional accuracy of the antenna.

In some embodiments, coupling of asymmetric electromagnetic radiation to emitting element 210 may be limited or reduced by including a symmetric portion in the antenna feed between the asymmetric portion and the emitting element 210. In this way, electromagnetic radiation leaks in a symmetric fashion in the region immediately adjacent to emitting element 210. At the same time, asymmetric electromagnetic radiation emitted by the asymmetric portion of antenna feed 230 is kept farther away from emitting element 210.

In some embodiments, conductors 234 and 236 have the same shape. Hence, this region of antenna feed 230 is 180°-rotationally symmetric with respect to axis 229. In this region, the conductor of surface S1 may have the same shape as the conductor of surface S2. Thus, in these embodiments, antenna feed 230 has a symmetric portion and an asymmetric portion.

As used herein, the expression "symmetric portion" of the antenna feed refers to the region of antenna feed 230 that is symmetric (e.g., 180°-rotationally symmetric) with respect to axis 229. The symmetric portion of antenna feed 230 may be such that, in this region, the conductors formed on the two opposite surfaces of antenna feed 230 have the same shape. The symmetric portion may be formed entirely on antenna feed portion 232, or may be formed in part on antenna feed portion 232 and in part on antenna feed portion 231. Similarly, the expression "asymmetric portion" of the antenna feed refers to the region of antenna feed 230 that is asymmetric (e.g., 180°-rotationally asymmetric) with respect to axis 229. The asymmetric portion of antenna feed 230 may be such that, in this region, the conductors formed on the two opposite surfaces of antenna feed 230 have different shapes. The asymmetric portion may be formed entirely on antenna feed portion 231, or may be formed in part on antenna feed portion 231 and in part on antenna feed portion 232.

To further reduce coupling of asymmetric electromagnetic radiation to emitting element 210, in some embodiments, electromagnetic shielding may be provided between the asymmetric portion of antenna feed 230 and emitting element 210. The shielding may be achieved, in some embodiments, by placing a conductive wall between emitting element 210 and antenna feed portion 231. One side of the conductive wall may define a first cavity and the other side of the conductive wall may define a second cavity, thus forming a multi-cavity antenna.

An example of a multi cavity-arrangement is illustrated in FIGS. 6A-6B, in accordance with some embodiments. In particular, FIG. 6A illustrates cavity 222 formed within conductive housing portion 202, and FIG. 6B illustrates cavity 224 formed within conductive housing portion 204. Cavity 222 is bounded, at its upper end, by conductive wall 203 (see FIG. 6B). In this example, conductive wall 203 is part of conductive housing portion 204, though in other embodiments, the conductive wall bounding cavity 222 may be part of conductive housing portion 202, or may be a separate piece.

In the example of FIGS. 6A-6B, antenna feed portion 231 is disposed in and passes through cavity 222, and antenna feed portion 232 is disposed in and passes through cavity 224. Conductive wall 203 may be designed (e.g., may be sufficiently conductive and/or sufficiently thick in the z-axis) to prevent or reduce transmission of electromagnetic radiation leaked by antenna feed portion 231 into cavity 224, thus reducing the extent to which the asymmetric electromagnetic radiation reaches emitting element 210. In some embodiments, conductive wall 203 includes an opening arranged to allow passage of antenna feed 230 therethrough. The opening may have any suitable shape and size, and may arranged so that, when inserted through it, antenna feed 230 is held firmly.

Figure 7B:
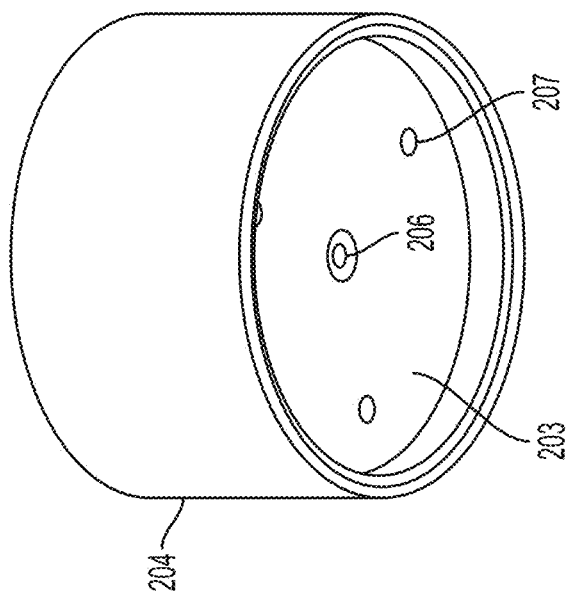
FIG. 7B is an isometric view of a second conductive housing portion of the illustrative RF antenna of FIG. 2, in accordance with some embodiments of the technology described herein.
Figure 7A:
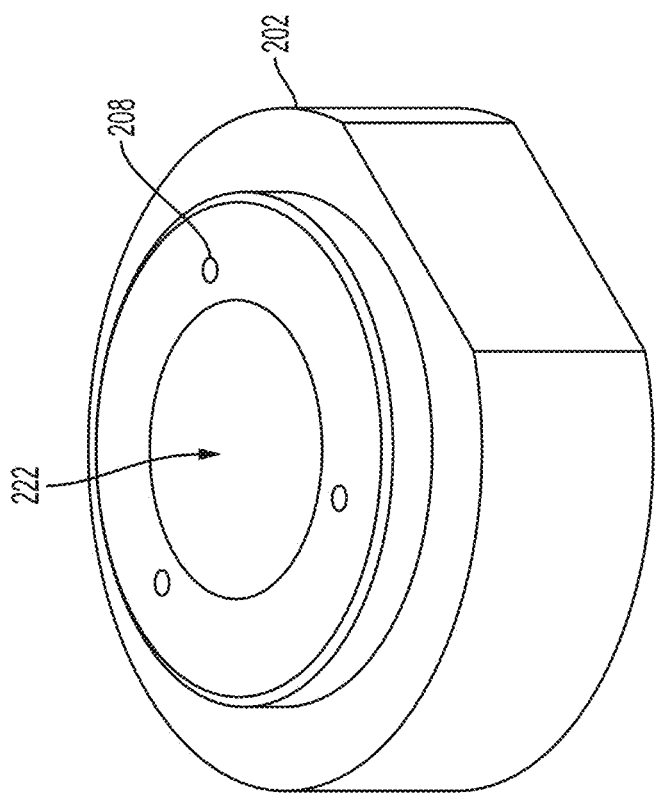
FIG. 7A is an isometric view of a first conductive housing portion of the illustrative RF antenna of FIG. 2, in accordance with some embodiments of the technology described herein.

An example of such an opening is shown in FIG. 7B, which illustrates the bottom of conductive housing portion 204. As shown, opening 206 is formed through conductive wall 203. When assembled, conductive housing portion 204 (FIG. 7B) is positioned on and is engaged to conductive housing portion 202 (FIG. 7A) with antenna 230 passing through opening 206. The perimeter of opening 206 and the perimeter of antenna feed 230 in the region passing through opening 206 may be sized to limit the size of the interstices formed in between, thus limiting leakage of asymmetric electromagnetic radiation generated inside cavity 222 into cavity 224.

Conductive housing portions 202 and 204 may be engaged with each other using any suitable mechanism, including, for example, screw threads formed on respective edges of the conductive housing portions. In one example, conductive housing portions 202 and 204 are fastened to each other using screws and nuts, where the screws are passed through openings 208 (FIG. 7A) and openings 207 (FIG. 7B).

Referring back to FIGS. 6A-6B, one or more absorbing members can be used to absorb RF radiation leaked from antenna feed 230, in some embodiments. For example, RF antenna 200 may include absorbing member 240 disposed inside cavity 222 and/or absorbing member 244 disposed inside cavity 224. The absorbing members may be made of a material capable of absorbing RF radiation at the frequencies used for RF antenna 200. For example, the absorbing member 240 and/or 244 may be made of solid foam, plastic, rubber or any suitable combination thereof. In some embodiments, absorbing members 240 and/or 244 may be shaped as donuts (or more generally with cut out regions extending along the z-axis) for allowing passage of antenna 230 when assembled with the conductive housing. Absorbing members 240 and 244 may occupy any suitable fraction of the volume of the respective cavities, such as between 50% and 100% of the volume, between 50% and 100% of the volume, between 70% and 100% of the volume, between 80% and 100% of the volume, or between 90% and 100% of the volume. Absorption of the electromagnetic radiation leaked from antenna feed 230 using absorbing members 240 and/or 244 may attenuate or suppress resonant modes arising due to reflections from the conductive housing walls, which may otherwise interfere with the emission pattern of emitting element 210.

In some embodiments, dielectric member 246 may serve as a spacer between absorbing member 244 and emitting element 210. Dielectric member 246 may be characterized by an RF absorption coefficient that is less than the RF absorption coefficient of absorbing member 244. For example, dielectric member 246 may be made of a low-absorption material or an absorption-free material. Dielectric member 246 may be positioned to provide sufficient distance between absorbing member 244 and emitting element 210 to prevent or limit absorption losses in the RF energy emitted by emitting element 210. Dielectric member 242 may be characterized by an RF absorption coefficient that is less than the RF absorption coefficient of absorbing member 240.

Figure 8:
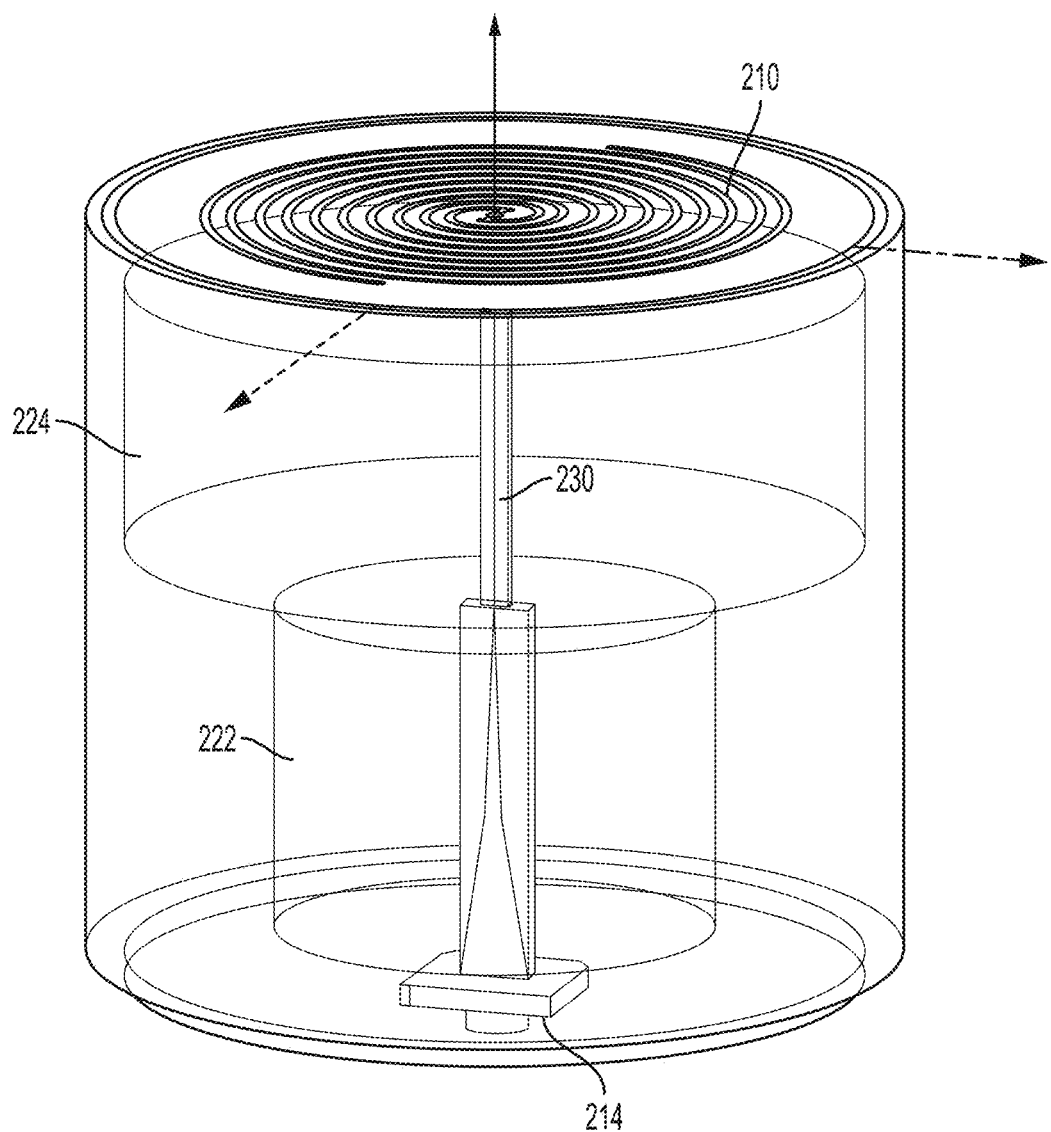
FIG. 8 is a see-through isometric view of the illustrative RF antenna of FIG. 2, in accordance with some embodiments of the technology described herein.

FIG. 8 illustrates RF antenna 200 when assembled, in accordance with some embodiments. As shown, RF antenna 200 includes a conductive housing forming a first cavity 222 separated from a second cavity 224 by a conductive wall. In this example, RF antenna 200 further includes an emitting element 210 coupled to the conductive housing, a port 214 coupled to the conductive housing, and an antenna feed 230 electrically coupling emitting element 210 to port 214. Antenna feed 230 passes through cavity 222, the conductive wall and cavity 224. In some embodiments, antenna feed 230 comprises a symmetric portion in contact with emitting element 210 and an asymmetric portion in contact with port 214. The symmetric portion may be at least partially (or, in some embodiments, entirely) in cavity 224. The asymmetric portion may be at least partially (or, in some embodiments, entirely) in cavity 222.

RF antenna 200 may be assembled in any suitable way. In some embodiments, antenna feed 230 is first attached to port 214, for example via soldering or other suitable techniques. Antenna feed 230 and port 214 may be coupled such that conductor 235 electrically contacts inner conductor 216, but not outer conductor 215, and conductor 233 electrically contacts outer conductor 215, but not inner conductor 216. Then, antenna feed 230 may be passed through an opening formed in the bottom of conductive housing portion 202, and port 214 may be secured to conductive housing portion 202. Subsequently, conductive housing portion 202 may be secured to conductive portion 204 such that antenna feed 230 passes through opening 206. Dielectric substrate 205, having emitting element 210 patterned thereon, may be secured to conductive housing portion 204 prior to or following connection of conductive housing portion 202 to conductive housing portion 204. The top end of antenna feed 230 may be passed through opening 209 of dielectric substrate 205. When assembled, conductor 236 electrically contacts conductive trace $211_A$ and conductor 234 electrically contacts conductive trace $211_B$.

Some of the embodiments described above include two cavities stacked on one another in the direction of extension of the antenna feed. In some of these embodiments, the asymmetric portion of the antenna feed is collinear with the symmetric portion of the antenna feed.

In some circumstances, the size of an RF antenna may be an important factor in the overall design of a micro-localization system. Some targets and interrogators, for example, are designed to be installed on mechanical components having small form factors, such as mini-robot arms and robot fingers. Other targets are designed to be placed on parts of a human body to monitor the orientation of the body. In these circumstances, having large RF antennas can lead to increases in the overall size of the component, making them impractical in certain applications.

Some RF antennas of the types described herein may be reduced in size by designing antenna feeds in which the symmetric portion and the asymmetric portion are not collinear (e.g., are angled relative to each other). In these embodiments, rather than extending primarily in one direction, the antenna feed can extend in two (or more) directions, thus providing additional flexibility in the design of the RF antenna. For example, one portion of the antenna feed (e.g., the symmetric portion) may extend along the height of a cavity and another portion of the antenna feed (e.g., the asymmetric portion) may extend along the base of the cavity. As a result, the height of the cavity, and thus the height of the RF antenna, may be reduced relative to other arrangements in which the antenna feed portions are collinear.

Figure 9:
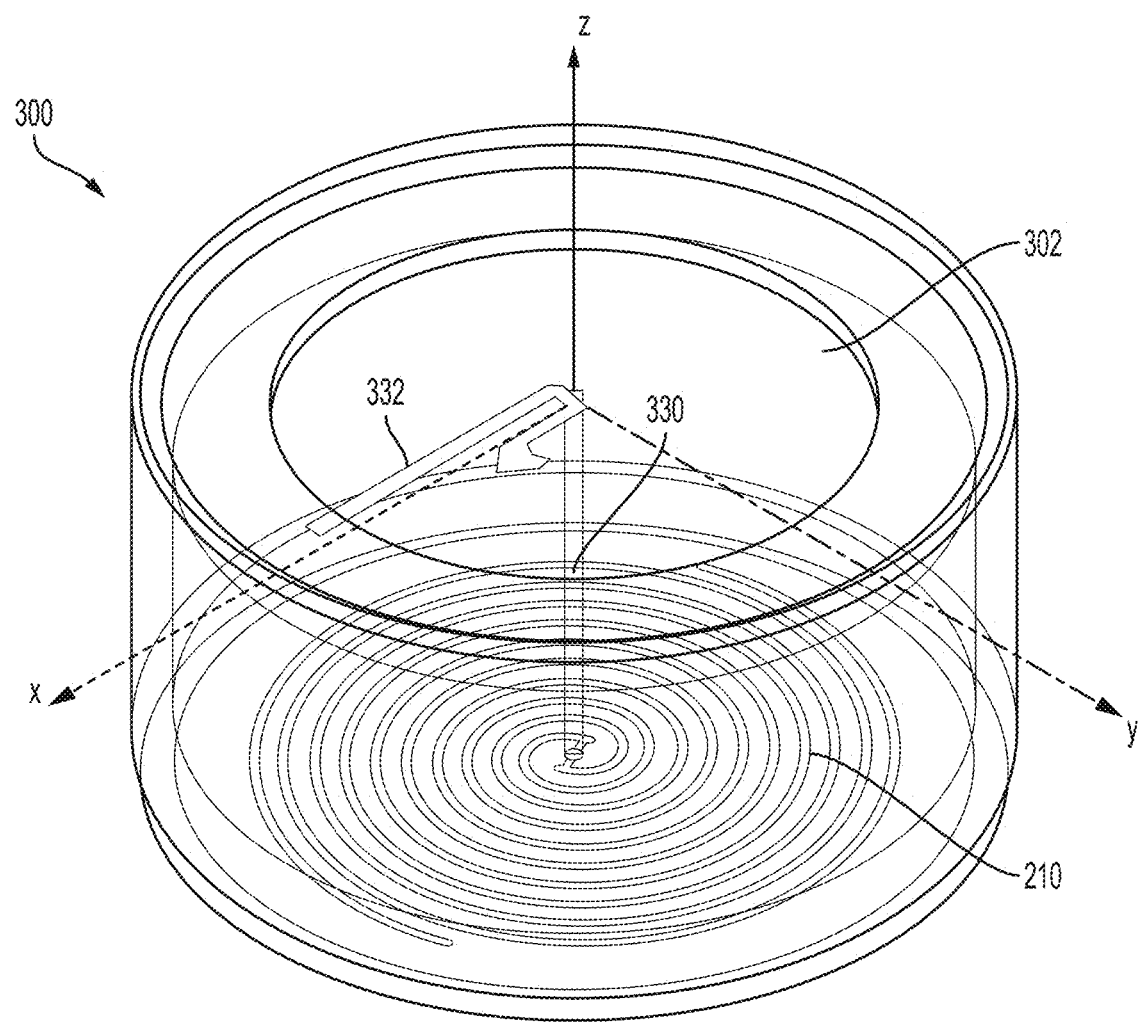
FIG. 9 is a see-through isometric view of another illustrative RF antenna that may be used in the interrogator device and/or target device of FIG. 1B, in accordance with some embodiments of the technology described herein.

One arrangement having an antenna feed with angled antenna feed portions is illustrated in FIG. 9, in accordance with some embodiments. As shown in FIG. 9, RF antenna 300 includes conductive housing 302, emitting element 210, symmetric portion 330 and asymmetric portion 332 (collectively forming the antenna feed of antenna 300) and a port (not shown in FIG. 9). Conductive housing 302 may be hollow, thus forming a cavity therein. In some embodiments, conductive housing 203 may be cylindrically shaped. Antenna feed symmetric portion 330 may extend along the height of the cavity (e.g., parallel to the z-axis) and may electrically couple emitting element 210 to antenna feed asymmetric portion 332. Antenna feed symmetric portion 330 may be designed so that most of the electromagnetic radiation leaked by the antenna feed that inadvertently couples to emitting element 210 is symmetric. In this way, asymmetries in the emission pattern of emitting element 210 are reduced or eliminated.

As shown in FIG. 9, in some embodiments, antenna feed asymmetric portion 332 may be angled (e.g., by an angle between 70° and 110°, between 80° and 100°, between 85° and 95°, including 90°) relative to antenna feed symmetric portion 330. In some embodiments, antenna feed asymmetric portion 332 may extend adjacent to the base of conductive housing 302 opposite to emitting element 210. For example, antenna feed asymmetric portion 332 may be closer to the base of conductive housing 302 opposite to emitting element 210 than to emitting element 210. Having a separation between antenna feed asymmetric portion 332 and emitting element 210 may reduce the exposure of emitting element 210 to asymmetric electromagnetic radiation.

In some embodiments, to further reduce the exposure of emitting element 210 to asymmetric electromagnetic radiation, antenna feed asymmetric portion 332 may be shielded from emitting element 210. Shielding may be achieved, for example, by using a conductive wall (not shown in FIG. 9) disposed between antenna feed asymmetric portion 332 and emitting element 210. In some embodiments, the conductive wall may lie in the xy-plane. In some embodiments, antenna feed symmetric portion 330 may pass through an opening formed in the conductive wall.

In some embodiments, one end of asymmetric portion 332 is connected to symmetric portion 330. The opposite end of asymmetric portion 332 is connected to the port. In some embodiments, the port may be positioned to contact a sidewall of conductive housing 302. This sidewall may be angled (e.g., by approximately 90°) relative to the plane of emitting element 210. Asymmetric portion 332 may be arranged to provide balanced-to-unbalanced conversion.

In some embodiments, a portion of the antenna feed (e.g., asymmetric portion 332) may be tapered to provide impedance matching between the port and emitting element 210. In some embodiments, another portion of the antenna feed (e.g., symmetric portion 330) may be untapered.

In some embodiments, an absorbing member (not shown in FIG. 9) may be positioned inside the cavity of RF antenna 300 to attenuate or suppress resonant modes that may otherwise distort the emission pattern of emitting element 210. A dielectric member (not shown in FIG. 9) may be used as a spacer between the absorbing member and emitting element 210 to prevent absorption losses in the RF energy emitted by emitting element 210.

IV. Angular Impulse Delay

The inventors have developed techniques than can aid RF designers in the design of RF antennas for use in micro-localization systems. The techniques described herein allow RF designers to estimate how accurate a micro-localization system using the designed antenna will be once manufactured. As such, the techniques described herein enable RF designers to iterate the design of an RF antenna, for example by adjusting certain antenna design parameters in an iterative fashion, until a satisfactory degree of accuracy is achieved.

The inventors have recognized that the ability to design RF antennas for use in micro-localization systems hinges on the ability to control the location of the phase center of the antenna. More specifically, the inventors have appreciated that unlike other types of antenna, knowing the location of the phase center of an antenna for use in micro-localization is important because the phase center defines the point of reference against which the location of an object is measured. In antenna theory, the phase center of an antenna is defined as the point of the antenna where the electromagnetic radiation is originated and spreads outwardly. In Global Positioning Systems (GPS), the positional accuracy is significantly larger than the size of the antennas. Thus, determining the phase center of GPS antennas is a relatively unimportant endeavor. However, when the desired accuracy is comparable or even smaller than the size of the antenna as in the case of micro-localization, determining the location of the antenna's phase center becomes critical.

Determining the location of the phase center is particularly difficult for wideband antennas. One challenge associated with the use of wideband antennas in the context of micro-localization stems from the frequency-dependent nature of the phase center. Wideband signals are characterized by frequency spectra having wide bandwidths. Each frequency of the spectrum propagates with different characteristics, which results in the location of the phase center being frequency-dependent. If not controlled properly, changes in the location of the phase center of antenna with changing frequencies can seriously impair the accuracy of a micro-localization system using such an antenna. Consider for example an illustrative micro-localization system of the types described above, where wideband antennas are used to reduce multipath interference. In this example, each frequency of the RF signals transmitted by an interrogator toward a target may originate at a different location of the transmit antenna. The fact that the points of origination are different at different frequencies creates discrepancies in the RF paths from the interrogator to the target, which reduces a the ability of a micro-localization system using such as antenna to localize the position of the target. The greater the extent to which the location of the phase center moves around as a function of frequency, the lower the system's ability to accurately locate objects.

In the design of antennas, controlling the location of the phase center of an antenna is challenging, especially if wideband signals are considered. This is due in part to the absence of reliable metrics that can be used by RF designers for this purpose. One conventional approach for computing the phase center of an antenna at different frequencies involves the use of complex, computational-intensive mathematical models, in which large systems of differential equations are solved for each of the frequencies being considered. Given their complexity, however, these approaches are seldom utilized in the design of antennas. Other conventional metrics used by RF engineers in the design of antennas include efficiency, directivity, beamwidth, effective aperture, radiation resistance, etc. Unfortunately, none of these metrics provides any indication as to the location of the phase center.

The lack of a suitable metric that can predict the location of an antenna's phase center at different frequencies makes it difficult to predict whether a micro-localization system using such an antenna, once manufactured, will be able to meet the degree of accuracy demanded by the application in which it is deployed.

The inventors have developed a technique that can be used in the design of antennas for micro-localization in which, instead of having to compute the location of the phase center at different frequencies, the antenna is designed under the assumption that the location of the phase center remains substantially unchanged at the different frequencies considered. In particular, the inventors have developed a metric that quantifies the time delay existing between the emission of an electromagnetic wave at a certain point in space and the reception of this electromagnetic wave at the assumed phase center of the antenna. The metric developed by the inventors is referred to herein as "angular impulse delay," or "AID." The benefit of AID is that it allows RF designers to quantify the difference in the delays between different points in space and the phase center of an antenna. For example, AID allows RF designers to determine whether, and the extent to which, the delay existing between the emission of a first electromagnetic wave at a first point in space and the reception of the first electromagnetic wave at the assumed phase center of the antenna differs from the delay existing between the emission of a second electromagnetic wave at a second point in space and the reception of the second electromagnetic wave at the assumed phase center of the antenna.

The advantage of the techniques described herein is two-fold. First, these techniques enable (once calibrated using appropriate calibration procedures) to determine the absolute value of the accuracy of a micro-localization system using such an antenna. Determining the absolute value of the spatial resolution can aid RF engineers in determining whether the antenna meets the accuracy requirements of a certain application. An example of a metric utilized herein for representing positional accuracy is "range error." Range error, typically expressed in centimeters or millimeters, indicates the error with which the location of an object can be determined using a micro-localization system. Smaller range errors indicate higher spatial resolutions.

Second, these approaches enable the determination of the accuracy with which a micro-localization system can locate objects as a function of the relative location of the object relative to the antenna. Quantifying the accuracy with which a micro-localization system can locate objects positioned at different points in space may aid RF designers in ensuring that the micro-localization system's accuracy is consistent across all possible directions. Consistency in the accuracy of a micro-localization system is particularly important because the orientation of a target relative to the corresponding interrogator(s) is generally random and not know a priori. Consider for example a system for micro-localizing the position of a robot arm. The robot arm may rotate in various ways over time, thus changing the angular positioning and orientation of the interrogator relative to the target device.

Angular impulse delay is a metric developed by the inventors that quantifies the RF delay between the phase center of an antenna and points in space around the antenna, where the location of the phase center is assumed to be substantially constant across different frequencies. Angular impulse delay can be related to positional accuracy, which can aid RF designers in determining whether a micro-localization system using the modeled antenna, once manufactured, will be able to meet the accuracy requirements of a given application. In some embodiments, the AID metric developed by the inventors may be used to design a new antenna for a micro-localization system. Additionally or alternatively, the AID metric developed by the inventors may be used to evaluate performance of one or more existing antenna designs. The evaluation results, in turn, may be used to select an antenna for use in a micro-localization system.

In some embodiments, angular impulse delay can be determined using the following expression:

$$AID(\theta,\varphi)=Arg(Max(h_{\theta,\varphi}(t))),$$

where $\theta$ and $\varphi$ are the elevation and azimuth angles, respectively, of a point in space relative to the phase center of the antenna (where a $\theta$, $\varphi$ pair is collectively referred to as a "look angle"), $AID(\theta, \varphi)$ represents angular impulse delay at different look angles, $h_{\theta,\varphi}(t)$ represents the time-dependent impulse response of the antenna to an electromagnetic impulse along the look angle $(\theta, \varphi)$. The quantity Max $(h_{\theta,\varphi}(t))$ represents the maximum, over time, of the impulse response, and the quantity $Arg(Max(h_{\theta,\varphi}(t)))$ represents the time at which the maximum of the impulse response occurs. It should be appreciated that not all embodiments are limited to determining AID according to the expression above. In some alternative embodiments, AID may be determined by computing the argument (Arg) of a value of the impulse response other than $Max(h_{\theta,\varphi}(t))$. For example, one embodiment may determine the argument of a value of the impulse response that is a certain fraction of $Max(h_{\theta,\varphi}(t))$, such as between 50% and 99.9% of $Max(h_{\theta,\varphi}(t))$, between 60% and 99.9% of $Max(h_{\theta,\varphi}(t))$, between 75% and 99.9% of $Max(h_{\theta,\varphi}(t))$, between 80% and 99.9% of $Max(h_{\theta,\varphi}(t))$, between 85% and 99.9% of $Max(h_{\theta,\varphi}(t))$, between 90% and 99.9% of $Max(h_{\theta,\varphi}(t))$, between 95% and 99.9% of $Max(h_{\theta,\varphi}(t))$, or within any suitable range within such ranges.

In some embodiments, in determining the AID at different look angles, the phase center of the antenna is assumed to be at a specific point of the antenna and its location is assumed to remain substantially constant across the frequency bandwidth of interest.

Figure 10B:
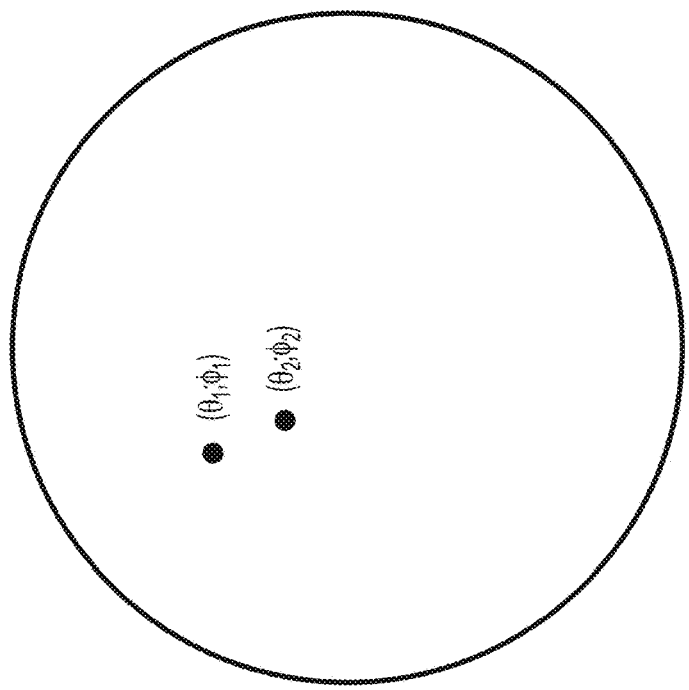
FIG. 10B is another illustrative diagram illustrating multiple look angles, with each look angle inside the circle corresponding to a respective look angle on the surface of the hemisphere of FIG. 10A, in accordance with some embodiments of the technology described herein.
Figure 10A:
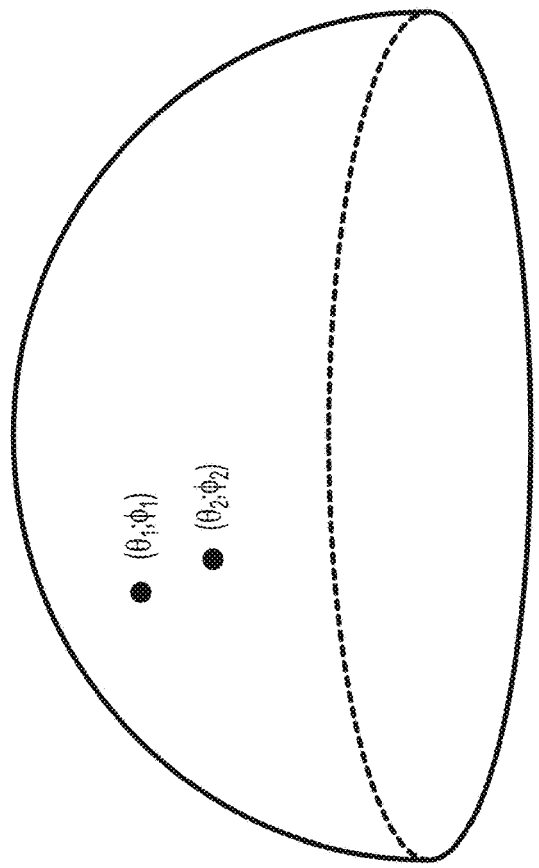
FIG. 10A is an illustrative diagram illustrating a hemisphere having multiple look angles, in accordance with some embodiments of the technology described herein.

Different look angles are illustrated in FIG. 10A, which depicts a hemisphere having the phase center of the antenna at its center, and where the surface of the hemisphere consists of all possible look angles relative to the phase center. Two specific look angles are illustrated in FIG. 10A. The first look angle corresponds to elevation angle $\theta_1$ and azimuth angle $\varphi_1$, and the second look angle corresponds to elevation angle $\theta_2$ and azimuth angle $\varphi_2$.

In some embodiments, the impulse responses $h_{\theta,\varphi}(t)$ can be determined numerically. For example, the impulse response may be determined by computing the Fourier transform of the electric field at a given look angle, where the electric field may be a complex quantity. While the impulse response may be computed based on electric fields in some embodiments, the impulse response may also be computed based on the magnetic field or other equivalent quantities representative of electromagnetic fields. It should be noted that the expressions "Fourier transform" and "Fourier transforming" may be used herein to indicate a direct Fourier transform or an inverse Fourier transform.

Figure 11A:
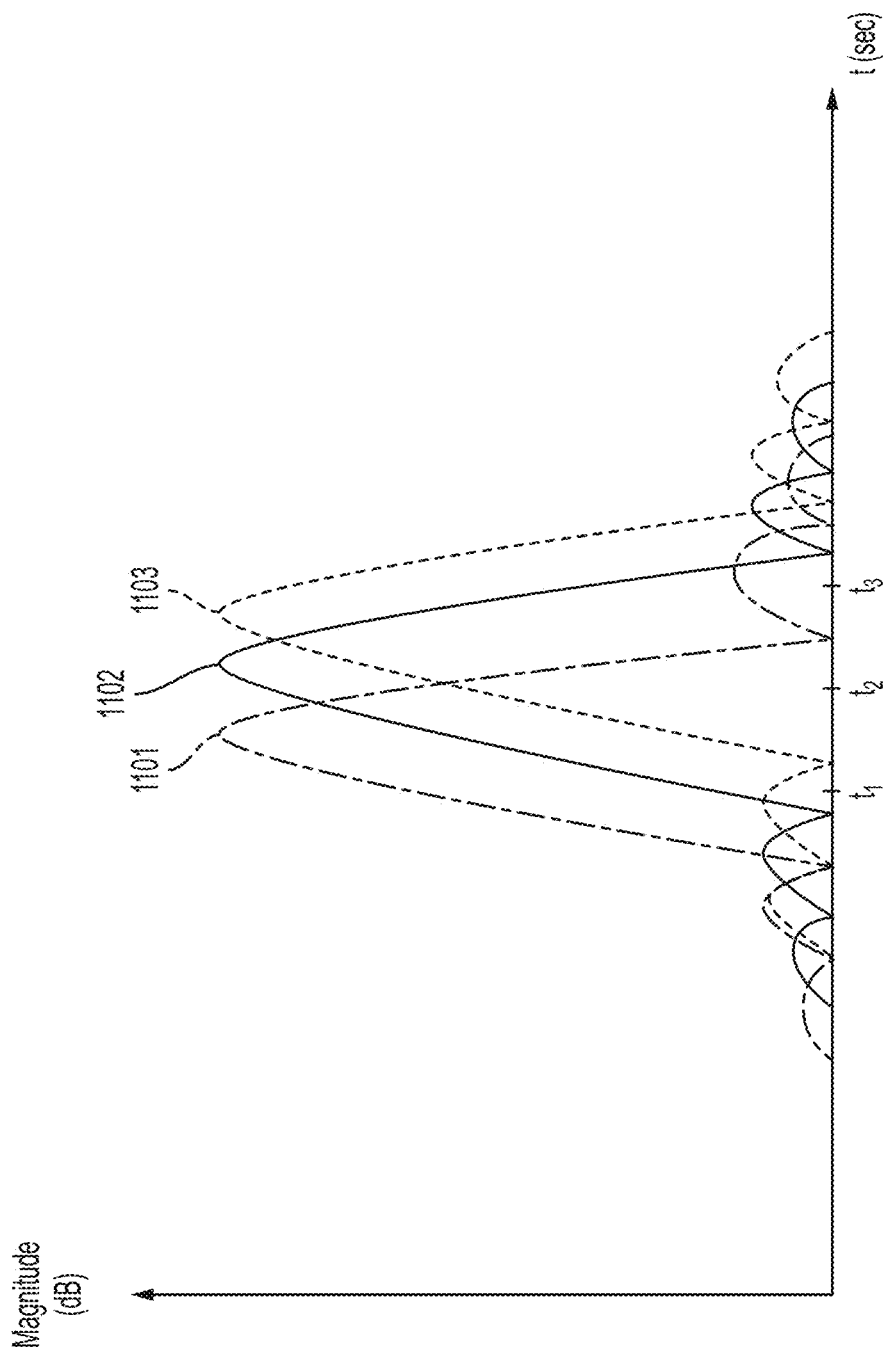
FIG. 11A is a plot illustrating three example impulse responses of an RF antenna for three corresponding look angles, in accordance with some embodiments of the technology described herein.

The electric field (or other equivalent quantities), in turn, may be computed using any suitable numerical tool, which may be configured for example to solve the Maxwell equations in the system being considered. Examples of impulse response obtained at different look angles are shown in FIG. 11A, in accordance with some embodiments. FIG. 11A is a plot illustrating three impulse responses (1101, 1102 and 1103) as a function of time. The fact that the impulse responses are shifted in time relative to each other indicates that the three points in space corresponding to the three impulse responses are seen by the antenna as having different RF delays relative to the phase center. Impulse response 1101 is such that the RF delay of the corresponding point in space has a delay of $t_1$. Impulse response 1102 is such that the RF delay of the corresponding point in space has a delay of $t_2$. Impulse response 1103 is such that the RF delay of the corresponding point in space has a delay of $t_3$. The AID at the three look angles considered is equal to $t_1$, $t_2$, and $t_3$, respectively. Having different delays for different look angles indicates that the points on a hemisphere centered about the antenna phase center would be estimated, from measurements obtained by the antenna, to be at three different ranges even though every point on the hemisphere is actually located at the same distance from the phase center.

In some embodiments, the range error of the antenna at different look angles can be derived from the AID. The range error indicates the error with which the distance between a point in space and the phase center of the antenna is estimated. The range error can be used as a measure of the positional accuracy of the RF antenna.

An AID constant across all different look angles would indicate that the antenna has an accuracy that is independent of the look angle. In practice, a variability in the delays obtained at different look angles may arise, indicating that the antennas responds with different accuracies depending on the look angle. In some embodiments, the positional accuracy of the antenna may be determined by multiplying, at each look angle, AID with the velocity of the electromagnetic wave in the system.

The positional accuracy obtained using the approach described herein can be visualized using heat maps. For ease of illustration, heat maps representing positional accuracy at different look angles will be depicted using two dimensional plots, where each point inside a circle (see FIG. 10B) corresponds to a point in the surface of the hemisphere of FIG. 10A.

Figure 12B:
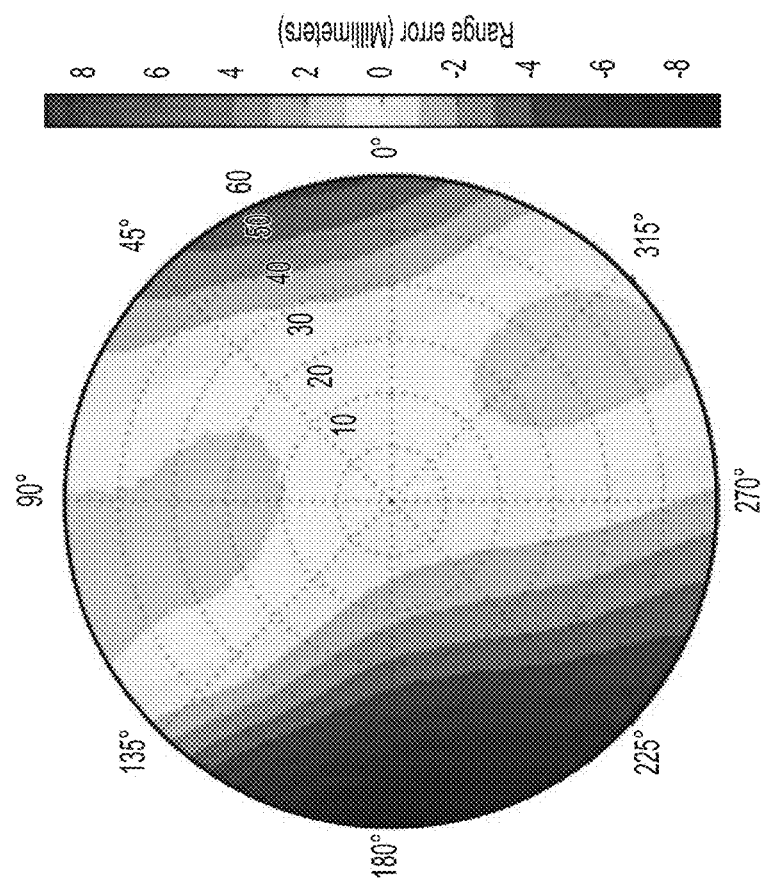
FIG. 12B is a heat map illustrating the range error of another RF antenna at different look angles, in accordance with some embodiments of the technology described herein.
Figure 12A:
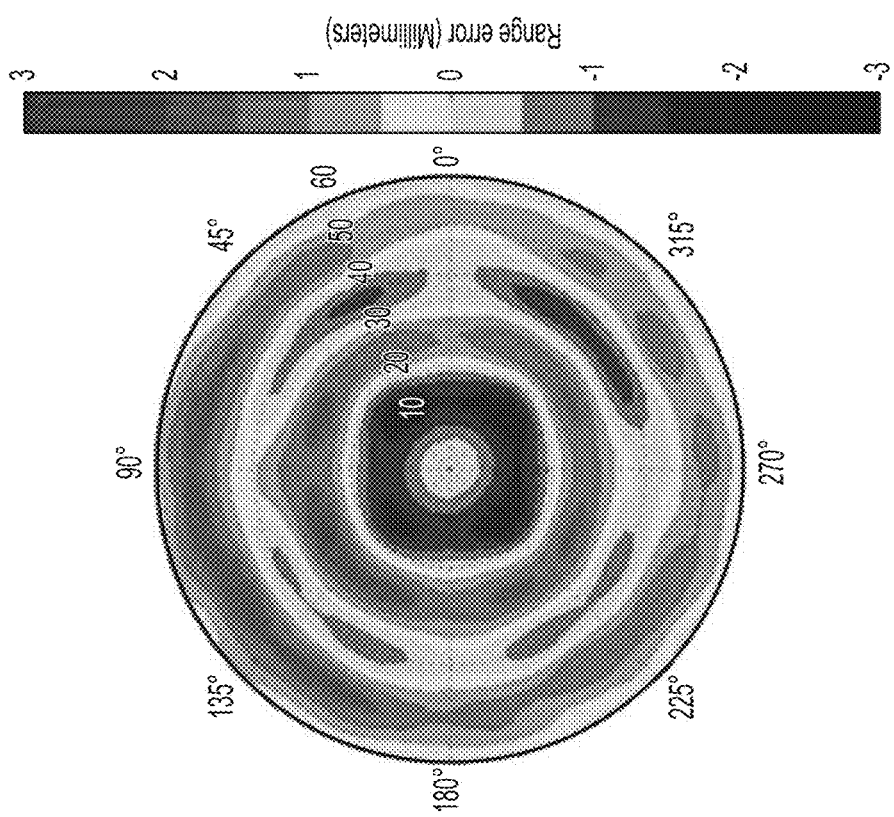
FIG. 12A is a heat map illustrating the range error of an RF antenna at different look angles, in accordance with some embodiments of the technology described herein.

Two examples of heat maps obtained for two different antenna designs are illustrated in FIGS. 12A-12B, in accordance with some embodiments. These heat maps correspond to the same general type of antenna, where certain design parameters were varied between the design of FIG. 12A and that of FIG. 12B. In particular, the design corresponding to FIG. 12A was achieved using the design techniques described herein. Thus, it should be appreciated that the techniques described herein may serve as a particularly valuable tool for designing antennas for micro-localization. An illustrative antenna design that was improved for micro-localization using the techniques described herein is described below with reference to FIGS. 14A-B and 15A-B. FIGS. 12A-12B are described herein for illustrative purposes to introduce the concept of range error heat maps.

The heat map of FIG. 12A exhibits an overall 360° rotational symmetry relative to the azimuth angle, indicating that the antenna responds with substantially the same range error regardless of the angle in the plane. However, the antenna's response when the elevation angle is varied is not constant. Nonetheless, the maximum variability in the positional accuracy of the antenna is 6 mm (spanning from −3 mm to 3 mm). In this plot, a positive range error indicates that the distance between the corresponding point and the phase center is overestimated. By contrast, a negative range error indicates that the distance between the corresponding point and the phase center is underestimated.

In the heat map of FIG. 12B, the positional accuracy is substantially degraded in absolute value and variability relative to the example of FIG. 12A. As shown, this heat map generally exhibits a 180° symmetry with respect to the azimuth angle, indicating that different angles yield significantly different range errors. Furthermore, the overall variability of the range error is 18 mm (spanning from −9 mm to 9 mm), which is significantly larger than the variability of FIG. 12A. It should be appreciated that different ways of plotting range errors or other parameters derived from AID may be used to visualize the positional accuracy of an antenna at different look angles.

V. Design of RF Antennas Using Angular Impulse Delay

The techniques described herein may be used to select one particular antenna designs among a plurality of antenna designs that is suitable for the requirements set forth by a given application. In some embodiments, the techniques described herein, including the techniques using AID, may be used for evaluating different antenna designs. The different antenna designs may be characterized by different parameters. Hence, the techniques described herein may aid RF designers in evaluating each particular set of parameters as the parameters as varied.

Figure 13:
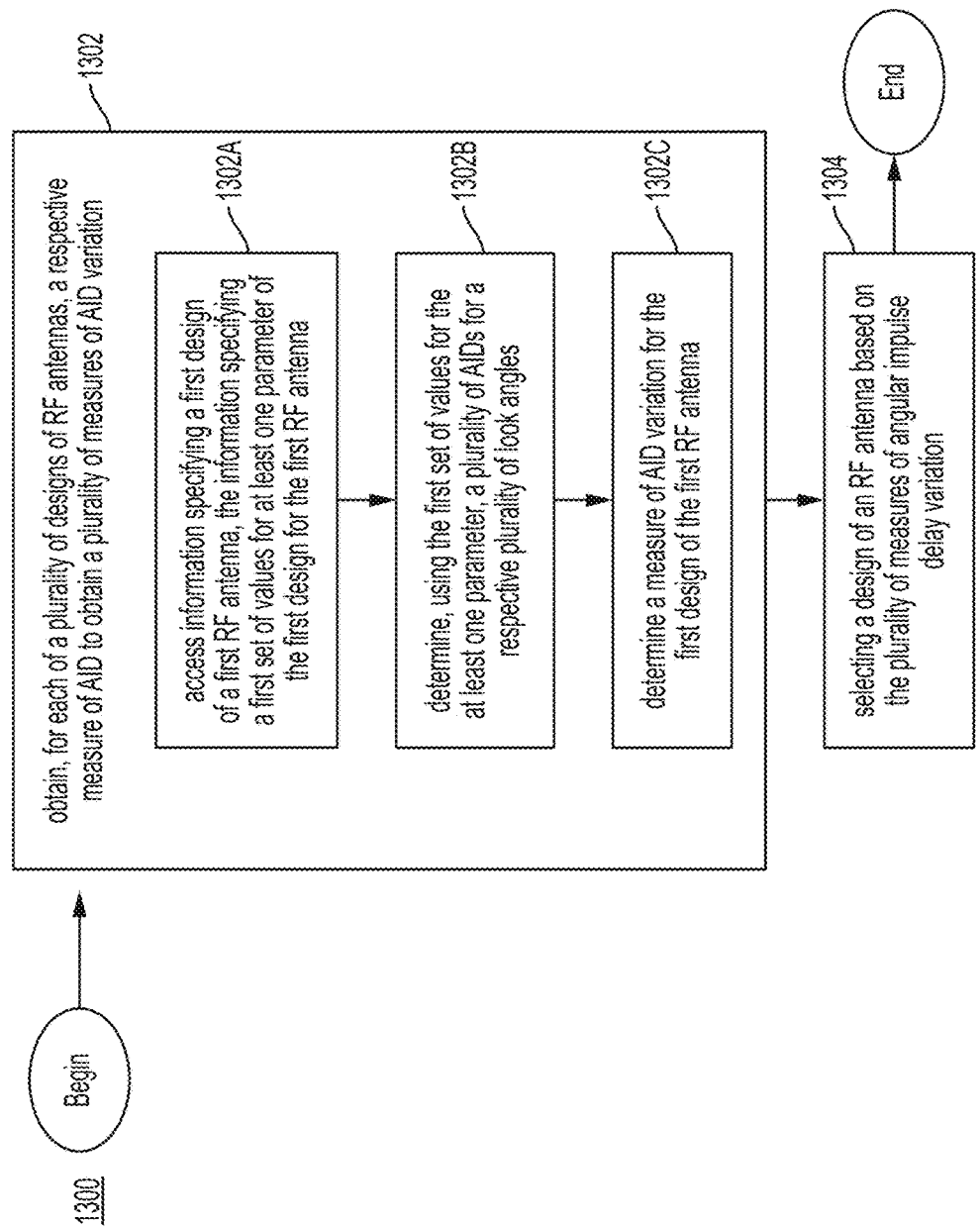
FIG. 13 is a flowchart illustrating an example process for selecting an RF antenna to use in a micro-localization system, in accordance with some embodiments of the technology described herein.

An example process for designing an antenna using the techniques described herein is shown in FIG. 13, where AID may be as a means of evaluating Process 1300 begins at act 1302, in which measures of AID are obtained for each of a plurality of designs of RF antennas, where each of the plurality of designs may be characterized by one or more different parameters. The measures of AID may be used to obtained measures of AID variability across different look angles. In some embodiments, act 1302 may comprise acts 1302A, 1302B and 1302C.

At act 1302A, information specifying a first design of a first RF emitting element is accessed. The information may specify a first set of values for at least one parameter of the first design for the first RF antenna. Examples of parameters include the width of a conductive trace (e.g., the width of conductive trace $211_A$ of FIG. 3A), the spacing between two conductive traces (e.g., the spacing between conductive trace $211_A$ and $211_B$, or the spacing between adjacent loops of conductive trace $211_A$), the number of loops of a spirally-shaped RF emitting element (e.g., the number of loops of emitting element 210 of FIG. 3A), the size and shape of an antenna feed (e.g., the size and shape of antenna feed 230 of FIG. 5A), the size and shape of antenna's conductive housing (e.g., the size and shape of conductive housing 202, 204 of FIG. 2), among other possible antenna parameters.

At act 1302B, a plurality of AIDs may be determined for a respective plurality of look angles using the first set of values for the at least one parameter. In some embodiments, determining the plurality of AIDs may involve computing a Fourier transform (or other suitable types of transforms). For example, determining the plurality of AIDs may comprise: 1) computing a radiation pattern (such as an electric field pattern) associated with the first design; 2) Fourier transforming the radiation pattern to obtain a plurality of impulse responses representing the response of the RF antennas to an electromagnetic impulse propagating from a point in space to the antenna's phase center; and 3) obtaining the plurality of AIDs using the impulse responses, for example using the expression described in § IV of this document.

At act 1302C, a measure of AID variation for the first design of the first RF antenna may be determined. This determination may be performed, for example, by determining the extent to which AID varies across different look angles.

Next, process 1300 proceeds to act 1304, where a design of an RF antenna is selected based on the plurality of measures of AID variation. For example, the design of the RF antenna that reduces (e.g., that reduces or minimizes the difference between the maximum value at any look angle and the minimum value at any look angle and/or that reduces or minimizes the difference between the maximum value within a certain range of look angles and the minimum value in the same range of any look angles) the angular impulse delay variation or range error variation may be selected in one embodiment.

In some embodiments, process 1300 may further comprises manufacturing the first RF antenna based on the first design.

Leveraging the techniques described herein, the inventors have designed RF antennas for use in micro-localization that provide exceptionally large degrees of spatial accuracy. In one example, emitting element 210 (see e.g., FIG. 2), was modeled using the techniques described herein to reduce range error variability across different look angles. In particular, the model was employed to determine how changes in certain design parameters of the emitting element 210 affect its range error variability.

Figure 14B:
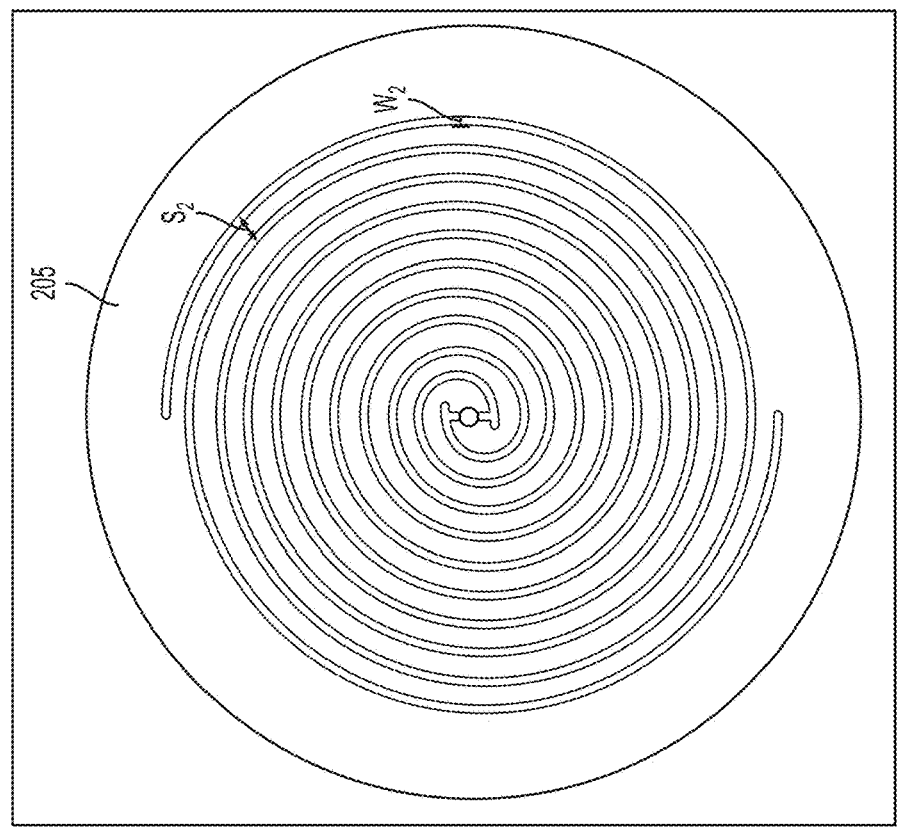
FIG. 14B is a schematic diagram illustrating a second design of an emitting element, in accordance with some embodiments of the technology described herein.
Figure 14A:
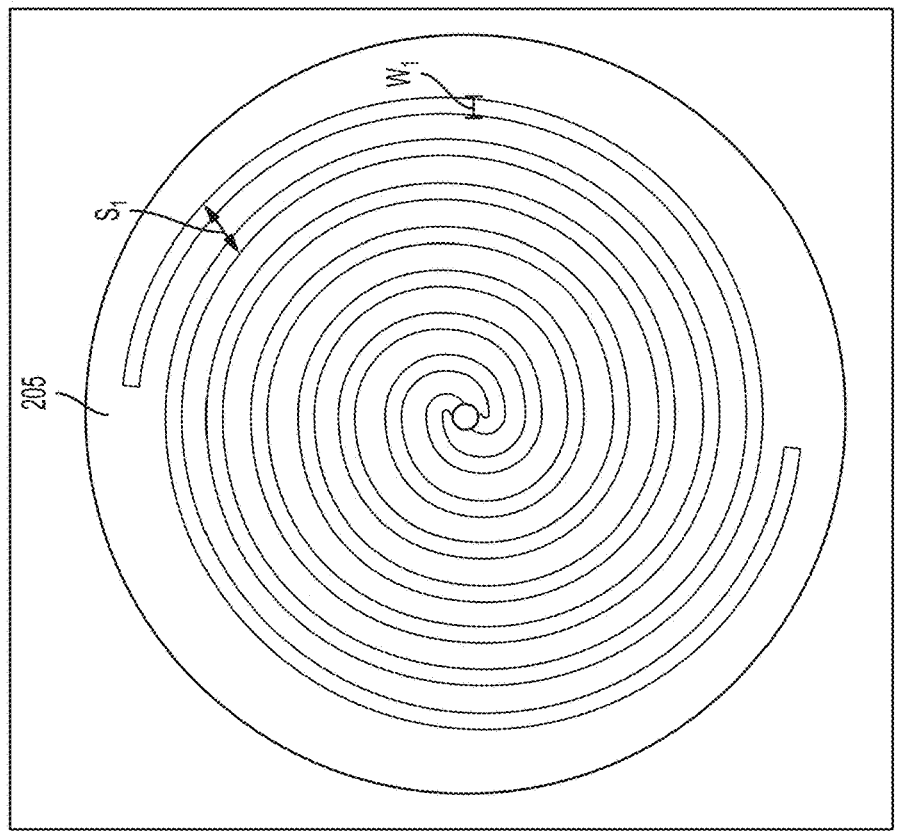
FIG. 14A is a schematic diagram illustrating a first design of an emitting element, in accordance with some embodiments of the technology described herein.

FIGS. 14A-14B illustrate two possible designs for emitting element 210, in accordance with some embodiments. In this case, emitting element 210 includes a pair of conductive traces formed on a dielectric substrate. The conductive traces are shown to be shaped as intertwined spirals, though not all embodiments are limited in this respect. Design techniques described herein were used to determine how the range error variability of the emitting element 210 varies when the width of the conductive traces and/or the separation between the conductive traces are varied. In the design of FIG. 14A, the conductive traces have a width $W_1$, and the separation between the conductive traces is $S_1$. It should be noted that, while the width of the conductive traces and the separation between the traces are shown to be constant, not all embodiments are limited in this respect as the width and/or the separation may vary along the length of the conductive traces. In the design of FIG. 14B, the conductive traces have a width $W_2$ (less than $W_1$), and the separation between the conductive traces is $S_2$ (less than $S_1$).

Figure 15B:
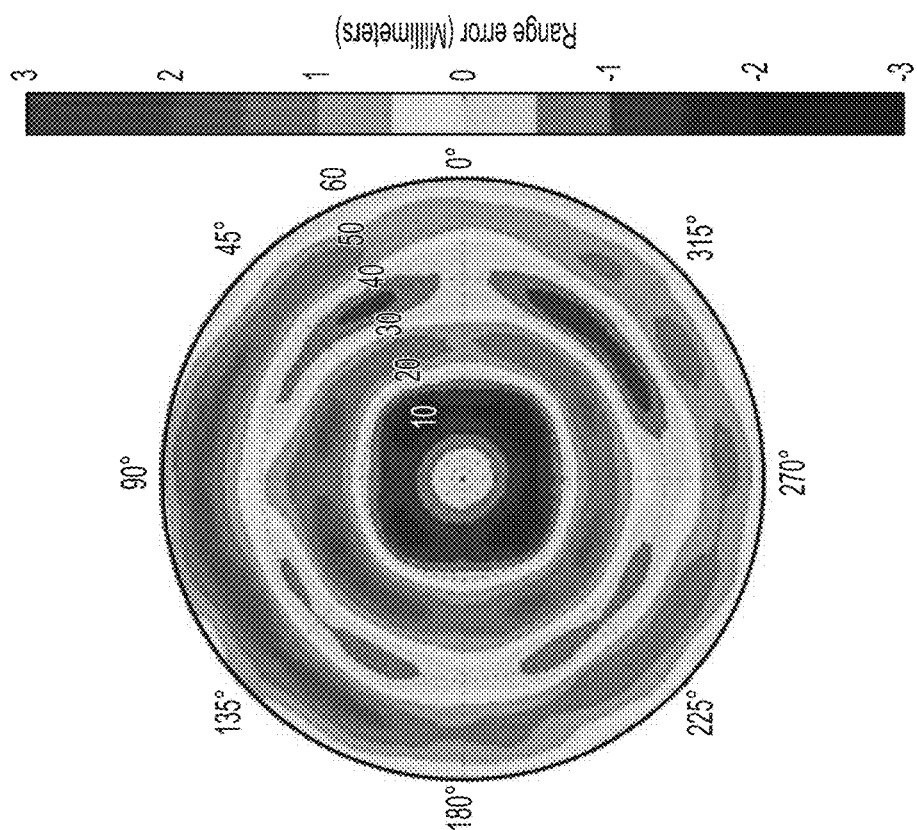
FIG. 15B is a heat map illustrating the range error associated with the illustrative design of FIG. 14B and computed using the techniques described herein, in accordance with some embodiments of the technology described herein.
Figure 15A:
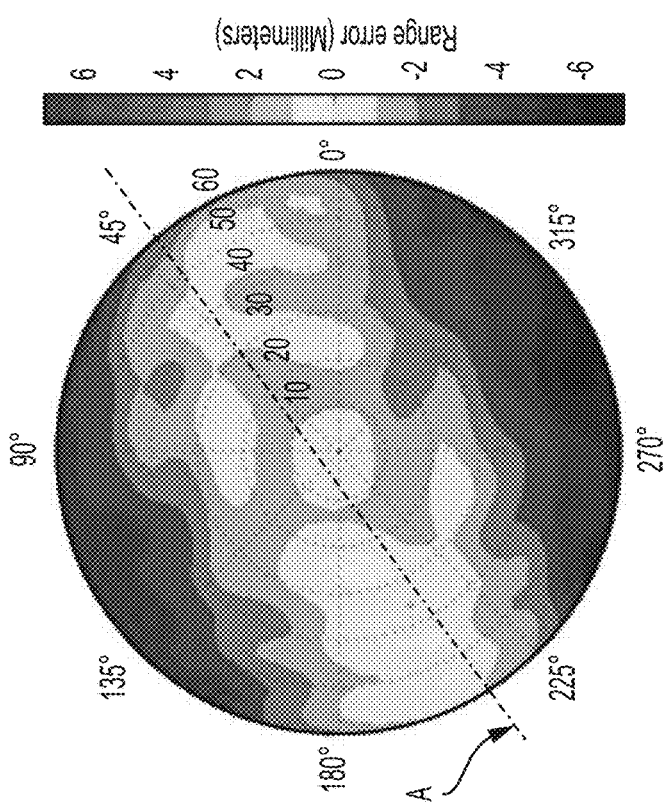
FIG. 15A is a heat map illustrating the range error associated with the illustrative design of FIG. 14A and computed using the techniques described herein, in accordance with some embodiments of the technology described herein.

FIGS. 15A-15B are heat maps representing range errors across different look angles for the designs of FIGS. 14A-14B, respectively. The range errors of FIGS. 15A-15B were obtained using the techniques described in § IV of this document. The heat map of FIG. 15A exhibits a general 180° symmetry with respect to the axis labeled "A." As a result, if one considers an elevation angle of 50°, azimuth angles between 180° and 225° exhibits range errors less than 1 mm while azimuth angles between 270° and 315° exhibits range errors greater than 3 mm. This large range error variability renders the design of FIG. 14A unsuitable for use in micro-localization applications demanding high accuracy uniformity. On the other hand, the heat map of FIG. 15B exhibits a general 360° symmetry. As result, the antenna responds with a relatively high degree of uniformity (with variability of less than 6 mm) across different look angles.

In some embodiments, reducing the width of the conductive traces produces a substantial improvement in the range error variability of the emitting element. In one example, the inventors appreciated that reducing the width the conductive traces to a value between 1 mm and 1.4 mm (e.g., 1.2 mm) produces a substantial improvement in the range error variability of the emitting element.

In some embodiments, reducing the separation between the conductive traces produces a substantial improvement in the range error variability of the emitting element. In one example, the inventors appreciated that reducing the separation between the conductive traces to a value between 0.8 mm and 1.2 mm (e.g., 1 mm) produces a substantial improvement in the range error variability of the emitting element.

Thus, the range error uniformity of the emitting element 210 can be improved by reducing the width of the conductive traces and/or by reducing the separation between the conductive traces. This optimization in the design of emitting element 210 was achieved thanks to the design techniques described herein, which allow RF designers to predict, in a quantitative fashion, the range error of an antenna and its variability across different look angles.

VI. Characterization of RF Antennas Based on Angular Impulse Delay

The techniques described herein may be used to characterize the positional accuracy of a given antenna, for example to determine whether the antenna meets the accuracy requirements of a certain application. Characterization of antennas may be useful for example if, due to economic considerations or the like, buying an antenna already made is a more desirable option than designing a new antenna altogether. Alternatively, characterization of antennas may be useful to confirm whether an antenna designed using the techniques described herein, once manufactured, actually provides the positional accuracy estimated in the design phase.

Figure 16A:
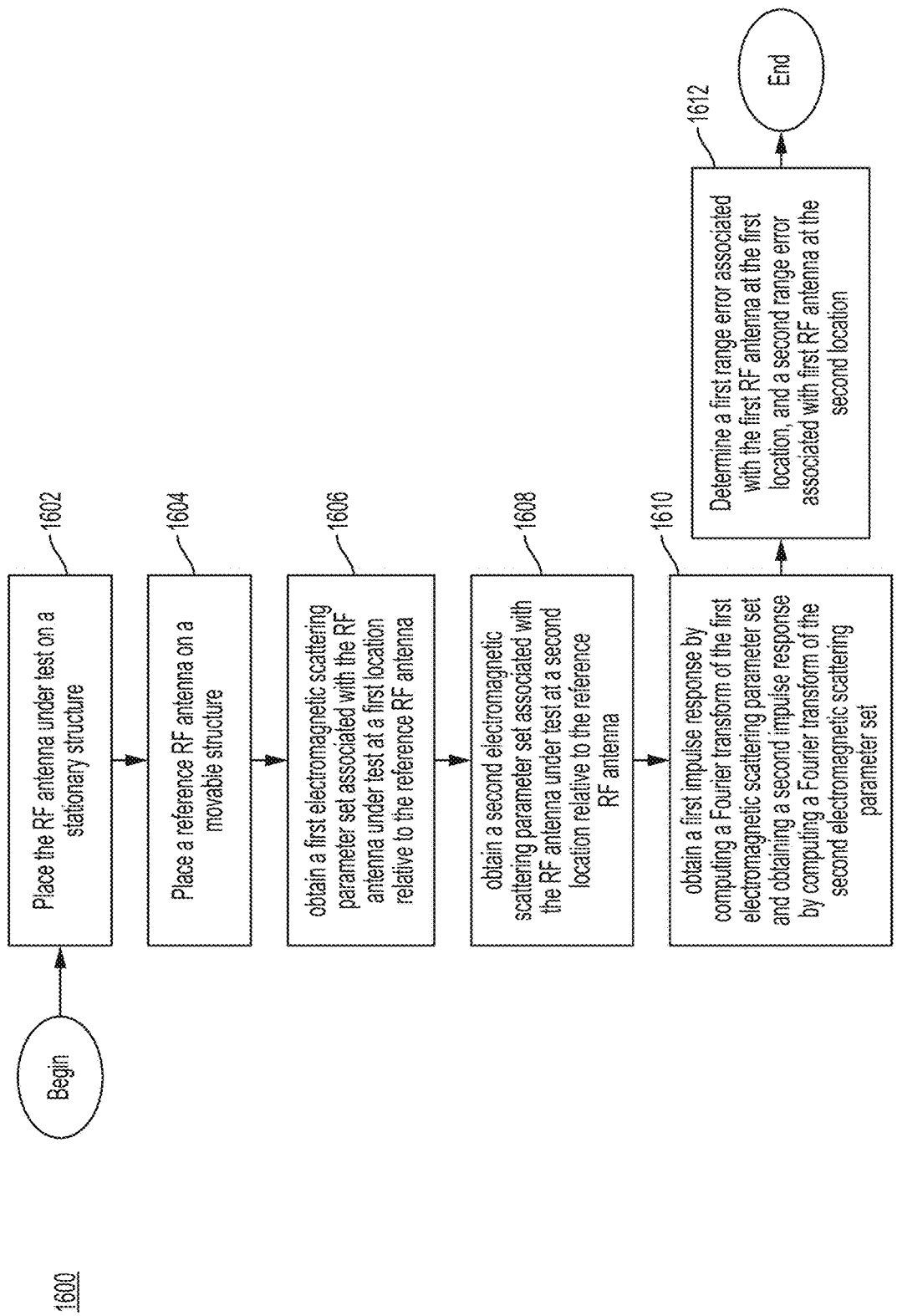
FIG. 16A is a flowchart illustrating an example process for characterizing an RF antenna for use in a micro-localization system, in accordance with some embodiments of the technology described herein.
Figure 16B:
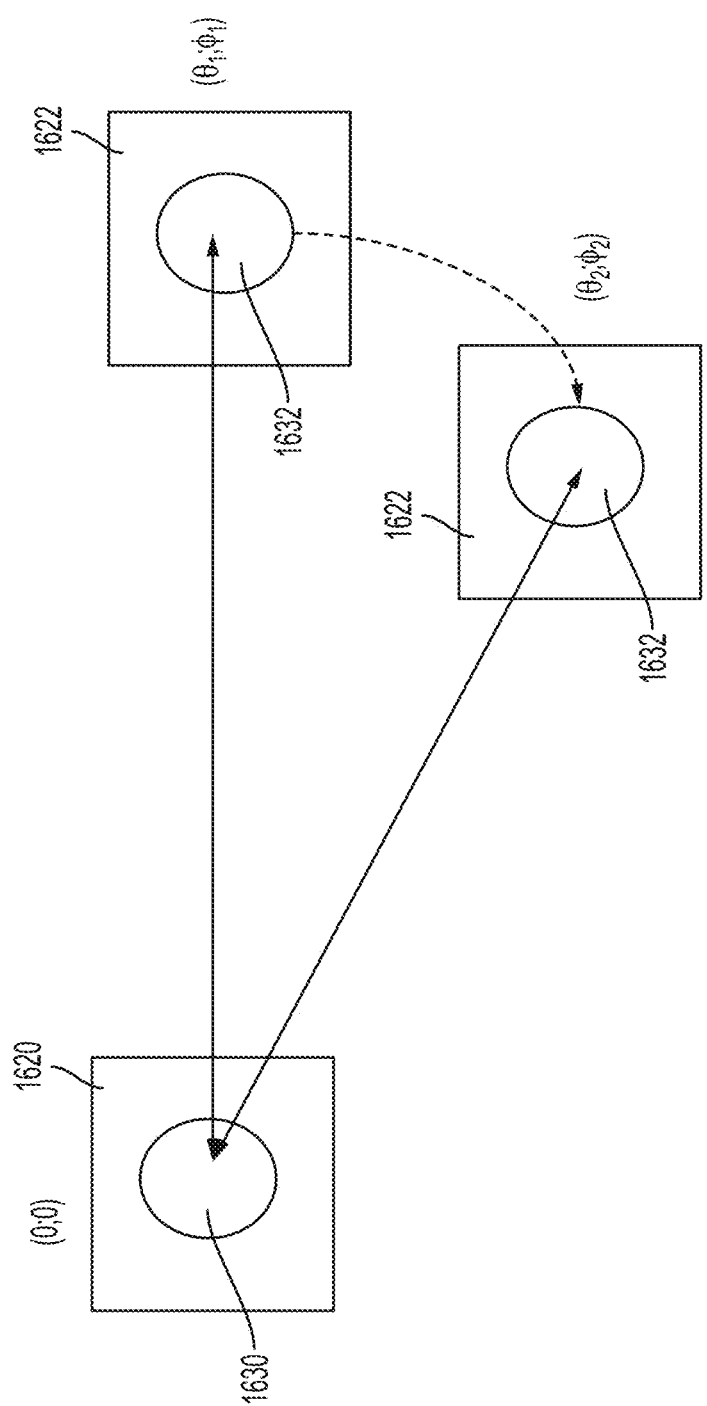
FIG. 16B is a schematic diagram illustrating an example set-up for performing the example process of FIG. 16A, in accordance with some embodiments of the technology described herein.

An example of process for characterizing an antenna for micro-localization using the techniques described herein is illustrated in FIG. 16A, and an example of a set-up for performing the process is illustrated in FIG. 16B, in accordance with some embodiments. Process 1600 begins at act 1602, in which the RF antenna under test is placed on a stationary structure. For example, RF antenna 1630 may be positioned on stationary structure 1620 (FIG. 16B). In the example illustrated, the antenna is positioned so that its assumed phase center is at the center of a coordinate system.

At act 1604, a reference RF antenna is placed on a movable structure. For example, RF antenna 1632 may be positioned on movable structure 1622 (FIG. 16B). The movable structure may include, for example, a movable robot arm. Initially, the antenna is positioned at an elevation angle $\theta_1$ and azimuth angle (pi relative to the assumed phase center of RF antenna 1630.

At act 1606, a first electromagnetic scattering parameter set associated with the RF antenna under test is obtained when the reference RF antenna is positioned at the first look angle $(\theta_1, \varphi_1)$. The first electromagnetic scattering parameter set may be frequency-dependent and as such may comprise a first plurality of values for a respective first plurality of frequencies. The first electromagnetic scattering parameter set may be obtained using any suitable method and using any suitable apparatus. In one example, a vector network analyzer (VNA) connected to the RF antenna under test and the reference RF antenna may be used to obtain the first electromagnetic scattering parameter set. One example of a scattering parameter is $S_{21}$, which represents the power transferred from the reference RF antenna to the RF antenna under test (or vice versa).

At act 1608, a second electromagnetic scattering parameter set associated with the RF antenna under test is obtained when the reference RF antenna is positioned at a second look angle ($\theta_2$, $\varphi_2$). As shown in FIG. 16B, the second look angle may be obtained by moving movable structure 1622 to another location. The second electromagnetic scattering parameter set may be obtained using methods similar to those described in connection with the first electromagnetic scattering parameter set.

At act 1610, a first impulse response is obtained by computing a Fourier transform of the first electromagnetic scattering parameter set and a second impulse response is obtained by computing a Fourier transform of the second electromagnetic scattering parameter set. The first and second impulse responses represent the response of the RF antenna under test to electromagnetic impulses generated at locations corresponding to the first look angle and the second look angle, respectively.

At act 1612, a first range error associated with the RF antenna under test may be determined at the first look angle using the first impulse response and a second range error associated with the RF antenna under test may be determined at the first look angle using the second impulse response. In some embodiments, the range errors may be determined by computing AIDs at the different look angles as described in § IV of this document.

The determination of range errors has been described in connection with two look angles. However, any suitable number of look angles may be considered in determining the RF antenna's range error. In some embodiments, range error variations at the different look angles may be computed based on the range errors obtained at act 1612. The range error variations may provide an indication as to how the antenna's positional accuracy varies depending on the direction of observation.

The characterization techniques for determining the suitability of antennas for micro-localization described herein may be implemented in any suitable settings. In some embodiments, the set-up of FIG. 16B may be implemented as part of a dedicated RF measurement range. In other embodiments, the set-up of FIG. 16B may be implemented in a general purposes laboratory. In some circumstances, using general purpose laboratories rather than dedicated RF measurement ranges may reduce the costs associated with the characterization because due to their complexities, use of dedicated RF measurement ranges can be particularly costly in some circumstances.

VII. Description of Some Computer-Implemented Embodiments

Techniques operating according to the principles described herein may be implemented in any suitable manner. Included in the Description above are a sequences of steps showing the steps and acts of various processes that enable modeling, design and characterization of RF antennas. The processing and decision blocks of the sequences above represent steps and acts that may be included in algorithms that carry out these various processes. Algorithms derived from these processes may be implemented as software integrated with and directing the operation of one or more single- or multi-purpose processors, may be implemented as functionally-equivalent circuits such as a Digital Signal Processing (DSP) circuit or an Application-Specific Integrated Circuit (ASIC), or may be implemented in any other suitable manner. It should be appreciated that the descriptions of sequences of steps included herein do not depict the syntax or operation of any particular circuit or of any particular programming language or type of programming language. Rather, the descriptions of sequences of steps illustrate the functional information one skilled in the art may use to fabricate circuits or to implement computer software algorithms to perform the processing of a particular apparatus carrying out the types of techniques described herein. It should also be appreciated that, unless otherwise indicated herein, the particular sequence of steps and/or acts described is merely illustrative of the algorithms that may be implemented and can be varied in implementations and embodiments of the principles described herein.

Accordingly, in some embodiments, the techniques described herein may be embodied in computer-executable instructions implemented as software, including as application software, system software, firmware, middleware, embedded code, or any other suitable type of computer code. Such computer-executable instructions may be written using any of a number of suitable programming languages and/or programming or scripting tools, and also may be compiled as executable machine language code or intermediate code that is executed on a framework or virtual machine.

When techniques described herein are embodied as computer-executable instructions, these computer-executable instructions may be implemented in any suitable manner, including as a number of functional facilities, each providing one or more operations to complete execution of algorithms operating according to these techniques. A "functional facility," however instantiated, is a structural component of a computer system that, when integrated with and executed by one or more computers, causes the one or more computers to perform a specific operational role. A functional facility may be a portion of or an entire software element. For example, a functional facility may be implemented as a function of a process, or as a discrete process, or as any other suitable unit of processing. If techniques described herein are implemented as multiple functional facilities, each functional facility may be implemented in its own way; all need not be implemented the same way. Additionally, these functional facilities may be executed in parallel and/or serially, as appropriate, and may pass information between one another using a shared memory on the computer(s) on which they are executing, using a message passing protocol, or in any other suitable way.

Generally, functional facilities include routines, programs, objects, components, data structures, etc. that perform particular tasks or implement particular abstract data types. Typically, the functionality of the functional facilities may be combined or distributed as desired in the systems in which they operate. In some implementations, one or more functional facilities carrying out techniques herein may together form a complete software package. These functional facilities may, in alternative embodiments, be adapted to interact with other, unrelated functional facilities and/or processes, to implement a software program application. Embodiments are not limited to being implemented in any specific number, division, or type of functional facilities. In some implementations, all functionality may be implemented in a single functional facility.

Computer-executable instructions implementing the techniques described herein (when implemented as one or more functional facilities or in any other manner) may, in some embodiments, be encoded on one or more computer-readable media to provide functionality to the media. Computer-readable media include magnetic media such as a hard disk drive, optical media such as a Compact Disk (CD) or a Digital Versatile Disk (DVD), a persistent or non-persistent solid-state memory (e.g., Flash memory, Magnetic RAM, etc.), or any other suitable storage media. Such a computer-readable medium may be implemented in any suitable manner, including as computer-readable storage media 1706 of FIG. 17 described below (i.e., as a portion of a computing device 1700) or as a stand-alone, separate storage medium. As used herein, "computer-readable media" (also called "computer-readable storage media") refers to tangible storage media. Tangible storage media are non-transitory and have at least one physical, structural component. In a "computer-readable medium," as used herein, at least one physical, structural component has at least one physical property that may be altered in some way during a process of creating the medium with embedded information, a process of recording information thereon, or any other process of encoding the medium with information. For example, a magnetization state of a portion of a physical structure of a computer-readable medium may be altered during a recording process.

Figure 17:
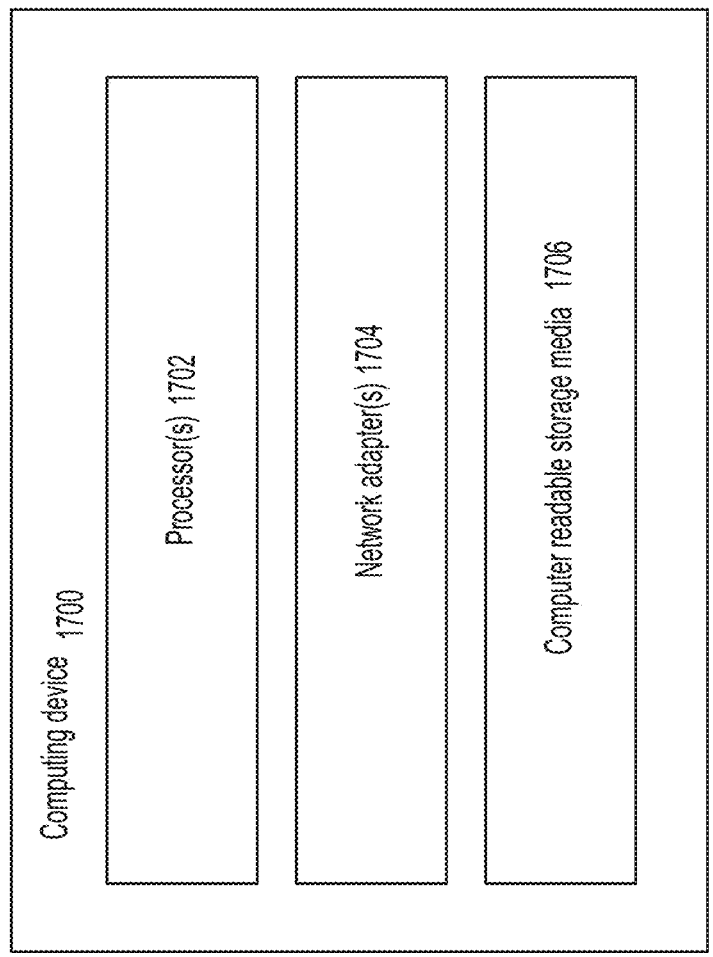
FIG. 17 is a block diagram illustrating an exemplary implementation of a computing device, in accordance with some embodiments of the technology described herein.

In some, but not all, implementations in which the techniques may be embodied as computer-executable instructions, these instructions may be executed on one or more suitable computing device(s) operating in any suitable computer system, including the exemplary computer system of FIG. 17, or one or more computing devices (or one or more processors of one or more computing devices) may be programmed to execute the computer-executable instructions. A computing device or processor may be programmed to execute instructions when the instructions are stored in a manner accessible to the computing device or processor, such as in a data store (e.g., an on-chip cache or instruction register, a computer-readable storage medium accessible via a bus, a computer-readable storage medium accessible via one or more networks and accessible by the device/processor, etc.). Functional facilities comprising these computer-executable instructions may be integrated with and direct the operation of a single multi-purpose programmable digital computing device, a coordinated system of two or more multi-purpose computing device sharing processing power and jointly carrying out the techniques described herein, a single computing device or coordinated system of computing devices (co-located or geographically distributed) dedicated to executing the techniques described herein, one or more Field-Programmable Gate Arrays (FPGAs) for carrying out the techniques described herein, or any other suitable system.

FIG. 17 illustrates one exemplary implementation of a computing device in the form of a computing device 1700 that may be used in a system implementing techniques described herein, although others are possible. It should be appreciated that FIG. 17 is intended neither to be a depiction of necessary components for a computing device to operate as a remote computing device in accordance with the principles described herein, nor a comprehensive depiction.

Computing device 1700 may comprise at least one processor 1702, a network adapter 1704, and computer-readable storage media 1706. Computing device 1700 may be, for example, a desktop or laptop personal computer, a personal digital assistant (PDA), a smart mobile phone, a server, a wireless access point or other networking element, or any other suitable computing device. Network adapter 1704 may be any suitable hardware and/or software to enable the computing device 1700 to communicate wired and/or wirelessly with any other suitable computing device over any suitable computing network. The computing network may include wireless access points, switches, routers, gateways, and/or other networking equipment as well as any suitable wired and/or wireless communication medium or media for exchanging data between two or more computers, including the Internet. Computer-readable media 1706 may be adapted to store data to be processed and/or instructions to be executed by processor 1702. Processor 1702 enables processing of data and execution of instructions. The data and instructions may be stored on the computer-readable storage media 1706.

The data and instructions stored on computer-readable storage media 1706 may comprise computer-executable instructions implementing techniques which operate according to the principles described herein. In the example of FIG. 17, computer-readable storage media 1706 stores computer-executable instructions implementing various facilities and storing various information as described above. Computer-readable storage media 1706 may store the inputs, the outputs and the lumped thermal characteristics described above, among other variables.

While not illustrated in FIG. 17, a computing device may additionally have one or more components and peripherals, including input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

Embodiments have been described where the techniques are implemented in circuitry and/or computer-executable instructions. It should be appreciated that some embodiments may be in the form of a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

VIII. Conclusion

Having thus described several aspects some embodiments, it is to be appreciated that various alterations, modifications, and improvements will readily occur to those skilled in the art. Such alterations, modifications, and improvements are intended to be within the spirit and scope of the present disclosure. Accordingly, the foregoing description and drawings are by way of example only.

Various features and aspects of the present disclosure may be used alone, in any combination of two or more, or in a variety of arrangements not specifically described in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the concepts disclosed herein may be embodied as a method, of which examples have been provided with reference to FIGS. 13 and 16A. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The terms "approximately", "substantially," and "about" may be used to mean within ±20% of a target value in some embodiments, within ±10% of a target value in some embodiments, within ±5% of a target value in some embodiments, and within ±2% of a target value in some embodiments. The terms "approximately" and "about" may include the target value.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

What is claimed is:

1. A radio-frequency (RF) antenna, comprising:
    a conductive housing having a first cavity and a second cavity separated from the first cavity by a conductive wall;
    an emitting element coupled to the conductive housing;
    a port coupled to the conductive housing; and
    an antenna feed electrically coupling the emitting element to the port, the antenna feed passing through the first cavity, the conductive wall, and the second cavity.

2. The RF antenna of claim 1, wherein the antenna feed comprises:
    a tapered portion; and
    an untapered portion.

3. The RF antenna of claim 2, wherein the untapered portion is at least partially in the first cavity and the tapered portion is at least partially in the second cavity.

4. The RF antenna of claim 2, wherein the second cavity is shielded to reduce coupling of RF radiation emitted by the tapered portion to the emitting element.

5. The RF antenna of claim 2, wherein the tapered portion of the antenna feed comprises an exponential taper.

6. The RF antenna of claim 1, wherein the antenna feed comprises:
    a symmetric portion with line symmetry with respect to a first line; and
    an asymmetric portion lacking line symmetry with respect to the first line.

7. The RF antenna of claim 6, wherein the symmetric portion of the antenna feed is at least partially in the first cavity and the asymmetric portion of the antenna feed is at least partially in the second cavity.

8. The RF antenna of claim 6, wherein the asymmetric portion of the antenna feed is tapered.

9. The RF antenna of claim 6, wherein a first width of the asymmetric portion of the antenna feed at a first point is greater than a second width of the asymmetric portion of the antenna feed at a second point, and wherein the first point is closer to the port than the second point.

10. The RF antenna of claim 6, wherein a width of the asymmetric portion of the antenna feed decreases with increasing distance from the port.

11. The RF antenna of claim 1, wherein the emitting element comprises first and second conductive traces disposed on a dielectric substrate.

12. The RF antenna of claim 11, wherein the first and second conductive traces are shaped as first and second spirals, respectively.

13. A micro-localization system, comprising an interrogator device comprising:
    a radio-frequency (RF) antenna comprising:
        a conductive housing having a first cavity and a second cavity separated from the first cavity by a conductive wall;
        an emitting element coupled to the conductive housing;
        a port coupled to the conductive housing; and
        an antenna feed electrically coupling the emitting element to the port, the antenna feed passing through the first cavity, the conductive wall, and the second cavity;
    wherein the RF antenna is configured to:
        transmit a first RF signal having a first center frequency to a target device different from the interrogator device, and
        receive, from the target device, a second RF signal having a second center frequency different from the first center frequency; and
    circuitry configured to:
        provide to the RF antenna the first RF signal having the first center frequency to be transmitted by the RF antenna; and
        process the second RF signal having the second center frequency received by the RF antenna together with a reference version of the first RF signal having the first center frequency to obtain an RF signal indicative of a distance between the interrogator device and the target device.

14. The system of claim 13, wherein the circuitry is configured to determine, using the RF signal, the distance between the interrogator device and the target device with an accuracy of less than 1 cm.

15. The system of claim 13, further comprising the target device, wherein the target device comprises:
    a second RF antenna configured to receive RF signals from the interrogator device,
    wherein, in response to receiving the first RF signal using the second RF antenna, the target device is configured to transmit, using the second RF antenna, the second RF signal generated using the first RF signal.

16. A radio-frequency (RF) antenna, comprising:
    a conductive housing comprising a first cavity;
    an emitting element coupled to the conductive housing;
    a port coupled to the conductive housing; and
    an antenna feed electrically coupling the emitting element to the port, the antenna feed passing through the first cavity and comprising:
        a symmetric portion in contact with the emitting element; and
        an asymmetric portion in contact with the port.

17. The RF antenna of claim 16,
    wherein the conductive housing comprises a second cavity separated from the first cavity by a conductive wall,
    wherein the symmetric portion is disposed at least partially in the first cavity and the asymmetric portion is disposed at least partially in the second cavity.

18. The RF antenna of claim 16, wherein the symmetric portion and the asymmetric portion are angled relative to each other.

19. The RF antenna of claim 16, wherein the asymmetric portion is tapered.

20. The RF antenna of claim 19, wherein at least a portion of the symmetric portion is untapered.

21. The RF antenna of claim 19, wherein the tapered asymmetric portion comprises an exponential taper.

22. The RF antenna of claim 16, wherein a first width of the asymmetric portion of the antenna feed at a first point is greater than a second width of the asymmetric portion of the antenna feed at a second point, and wherein the first point is closer to the port than the second point.

23. The RF antenna of claim 16, wherein width of the asymmetric portion of the antenna feed decreases with increasing distance from the port.

24. The RF antenna of claim 16, further comprising an RF absorbing member in the first cavity.

25. The RF antenna of claim 16, wherein the emitting element comprises first and second conductive traces disposed on a dielectric substrate.

26. The RF antenna of claim 25, wherein the first conductive trace is electrically coupled to a first side of the antenna feed and the second conductive trace is electrically coupled to a second side of the antenna feed.

27. The RF antenna of claim 25, wherein a portion of the first conductive trace surrounds at least partially the second conductive trace in a plane defined by the dielectric substrate, and a portion of the second conductive trace surrounds at least partially the first conductive trace in the plane.

28. The RF antenna of claim 16, wherein the symmetric portion of the antenna feed has line symmetry with respect to a first line, and the asymmetric portion of the antenna feed lacks line symmetry with respect to the first line.

29. A micro-localization system comprising an interrogator device,
the interrogator device comprising:
a radio-frequency (RF) antenna comprising:
a conductive housing comprising a first cavity;
an emitting element coupled to the conductive housing;
a port coupled to the conductive housing; and
an antenna feed electrically coupling the emitting element to the port, the antenna feed passing through the first cavity and comprising:
a symmetric portion in contact with the emitting element; and
an asymmetric portion in contact with the port;
wherein the RF antenna is configured to:
transmit a first RF signal having a first center frequency to a target device different from the interrogator device; and
receive, from the target device, a second RF signal having a second center frequency different from the first center frequency; and
circuitry configured to:
provide to the RF antenna the first RF signal having the first center frequency to be transmitted by the RF antenna; and
process the second RF signal having the second center frequency received by the RF antenna together with a reference version of the first RF signal having the first center frequency to obtain an RF signal indicative of a distance between the interrogator device and the target device.

30. The micro-localization system of claim 29, wherein the circuitry is configured to determine, using the RF signal, the distance between the interrogator device and the target device with an accuracy error of less than 1 cm.

* * * * *